United States Patent
Kendrick et al.

(10) Patent No.: US 9,365,022 B2
(45) Date of Patent: Jun. 14, 2016

(54) SYSTEM AND METHOD OF POST-CURE PROCESSING OF COMPOSITE CORE

(71) Applicant: Bell Helicopter Textron Inc., Fort Worth, TX (US)

(72) Inventors: Phillip A. Kendrick, Fort Worth, TX (US); S. Brent Woychesin, McKinney, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 413 days.

(21) Appl. No.: 13/914,756

(22) Filed: Jun. 11, 2013

(65) Prior Publication Data

US 2014/0360659 A1 Dec. 11, 2014

(51) Int. Cl.
*B32B 37/14* (2006.01)
*B29C 70/32* (2006.01)
(Continued)

(52) U.S. Cl.
CPC ............. *B32B 37/146* (2013.01); *B29C 65/483* (2013.01); *B29C 65/7838* (2013.01); *B29C 66/0042* (2013.01); *B29C 66/1142* (2013.01); *B29C 66/54* (2013.01); *B29C 66/63* (2013.01); *B29C 66/721* (2013.01); *B29C 66/7254* (2013.01); *B29C 66/8185* (2013.01); *B29C 66/83415* (2013.01); *B29C 70/32* (2013.01); *B29D 99/0089* (2013.01); *B29C 35/02* (2013.01); *B29C 65/486* (2013.01); *B29C 65/4835* (2013.01); *B29C 65/5042* (2013.01); *B29C 65/5057* (2013.01); *B29C 66/1122* (2013.01); *B29C 66/5227* (2013.01); *B29C 66/612* (2013.01); *B29C 66/71* (2013.01); *B29C 66/7212* (2013.01); *B29C 66/72141* (2013.01); *B29C 66/72143* (2013.01);
(Continued)

(58) Field of Classification Search
CPC .... B29C 66/54; B29C 70/32; B29D 99/0089; B32B 37/146; Y10T 156/10; Y10T 156/1059
See application file for complete search history.

(56) References Cited

U.S. PATENT DOCUMENTS 2,654,686 A 10/1953 Hansen
4,465,725 A 8/1984 Riel
(Continued)

FOREIGN PATENT DOCUMENTS

| EP | 1116563 B1 | 7/2001 |
| FR | 2929549 A1 | 10/2009 |
| WO | 2012017989 A1 | 2/2012 |

OTHER PUBLICATIONS

European Search Report in related European Application No. 13183401.2, dated Jan. 27, 2014, 4 pages.
(Continued)

*Primary Examiner* — Mark A Osele
*Assistant Examiner* — Christopher C Caillouet
(74) *Attorney, Agent, or Firm* — Noah A. Tevis

(57) ABSTRACT

A method of joining a first bulk composite core and a second bulk composite core by applying an adhesive to a surface network of the first bulk composite core; inserting a plurality of mandrels into a plurality of cell members of the first bulk composite core and a plurality of cell members of the second composite core, thereby aligning the cell members of the first bulk composite core to the cell members of the second bulk composite core; pressing the respective surface networks of the first bulk composite core and the second bulk composite core together with the adhesive located therebetween; and curing the adhesive.

17 Claims, 21 Drawing Sheets

(51) Int. Cl.
*B29C 65/00* (2006.01)
*B29C 65/48* (2006.01)
*B29C 65/78* (2006.01)
*B29D 99/00* (2010.01)
B29L 31/30 (2006.01)
B29C 65/50 (2006.01)
B29C 35/02 (2006.01)

(52) U.S. Cl.
CPC ........ *B29C 66/7392* (2013.01); *B29C 66/7394* (2013.01); *B29C 66/73711* (2013.01); *B29C 66/73712* (2013.01); *B29C 66/8122* (2013.01); *B29C 66/81261* (2013.01); *B29C 66/81467* (2013.01); *B29C 66/8284* (2013.01); *B29L 2031/3088* (2013.01); *B32B 2305/024* (2013.01); *B32B 2603/00* (2013.01); *Y10T 156/10* (2015.01); *Y10T 156/1059* (2015.01)

(56) References Cited

U.S. PATENT DOCUMENTS

| | | |
|---|---|---|
| 5,131,970 A | 7/1992 | Potter et al. |
| 5,399,221 A * | 3/1995 | Casella ...................... 156/274.4 |
| 5,735,986 A * | 4/1998 | Fell ............................... 156/160 |
| 2004/0126537 A1 | 7/2004 | Jackson et al. |
| 2010/0294422 A1 * | 11/2010 | Vache ................. B29C 67/0044 156/197 |

OTHER PUBLICATIONS

European Office Action in related European Application No. 13183401.2, dated Feb. 24, 2014, 6 pages.
European Office Action in related European Application No. 13183446.7, dated Feb. 27, 2015, 4 pages.
European Office Action in related European Application No. 13183446.7, dated Nov. 3, 2014, 5 pages.
European Office Action in related European Application No. 13183401.2, dated Jan. 21, 2015, 5 pages.
European Search Report in related European Application No. 13183446.7, dated Sep. 26, 2014, 3 pages.
Canadian Office Action in related Canadian Application No. 2,852,588, dated Jun. 8, 2015, 4 pages.
Canadian Office Action in related Canadian Application No. 2,852,585, dated Aug. 14, 2015, 6 pages.
European Notice of Allowance in related European Application No. 13183446.7, dated Sep. 23, 2015, 56 pages.

* cited by examiner

SYSTEM AND METHOD OF POST-CURE PROCESSING OF COMPOSITE CORE

BACKGROUND

1. Technical Field

The present disclosure relates to a system and method of post-cure processing of bulk composite core.

2. Description of Related Art

Typically, composite core is built in a large bulk shape that must be cut into usable slices that can then be milled to a final shape. Conventionally, cutting bulk composite core can be a labor intensive operation and result in a large amount of waste. Further, certain shapes of bulk composite core tend to distort during the cutting process.

Hence, there is a need for an improved system and method of post-cure processing of a bulk composite core.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
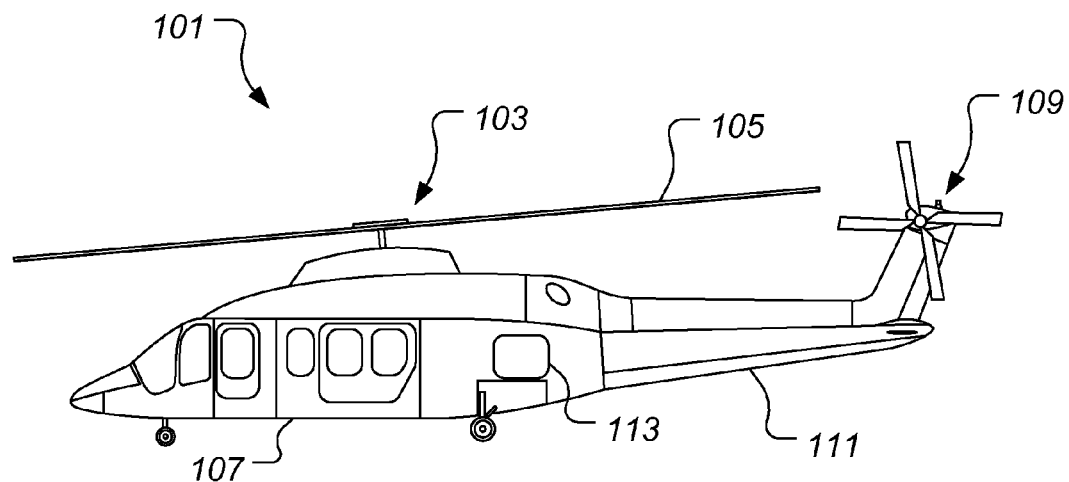
FIG. 1 is a side view of an rotorcraft, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 can further include a fuselage 107, anti-torque system 109, and an empennage 111.

Rotorcraft 101 is merely illustrative of the wide variety of aircraft, vehicles, and other objects that are particularly well suited to take advantage of the method and system of the present disclosure. It should be appreciated that other aircraft can also utilize the method and system of the present disclosure. Further, other vehicles and objects can utilize composite core manufactured by the system and method of the present disclosure. Illustrative embodiments can include wind turbine blades, sea based vehicles, radomes, enclosures, shelters, bridge decks, building facades, ground vehicles, rail vehicles, air vehicles, space vehicles, and manned or unmanned vehicles, to name a few.

Figure 2:
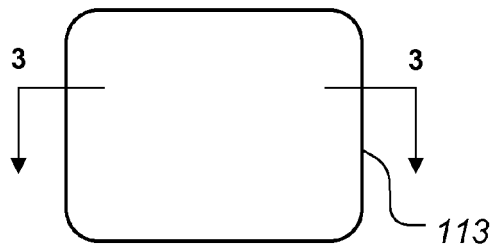
FIG. 2 is a side view of a panel, according to one example embodiment.
Figure 3:
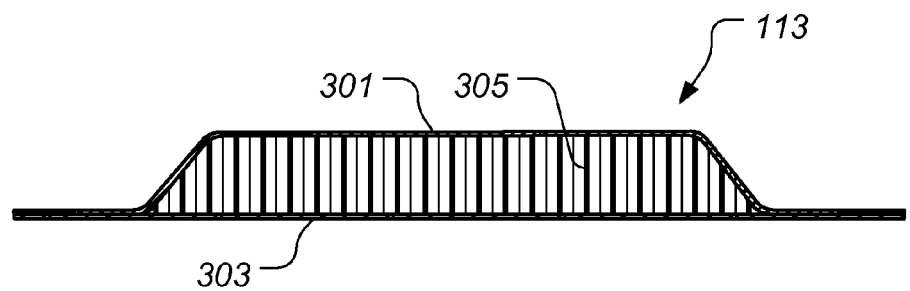
FIG. 3 is a cross-sectional view of the panel, taken from section lines 3-3 in FIG. 2, according to one example embodiment.

Referring now also to FIGS. 2 and 3, a panel 113 on rotorcraft 101 is illustrative of a wide variety of structures that can include a core member configured as a lightweight means of generating strength and stiffness in the structure. Panel 113 is a composite assembly that can include an upper skin 301, a lower skin 303, and a composite core 305. Composite core 305 can be adhesively bonded to upper skin 301 and lower skin 303. It should be appreciated that panel 113 can take on a wide variety of contours and configurations.

Figure 4:
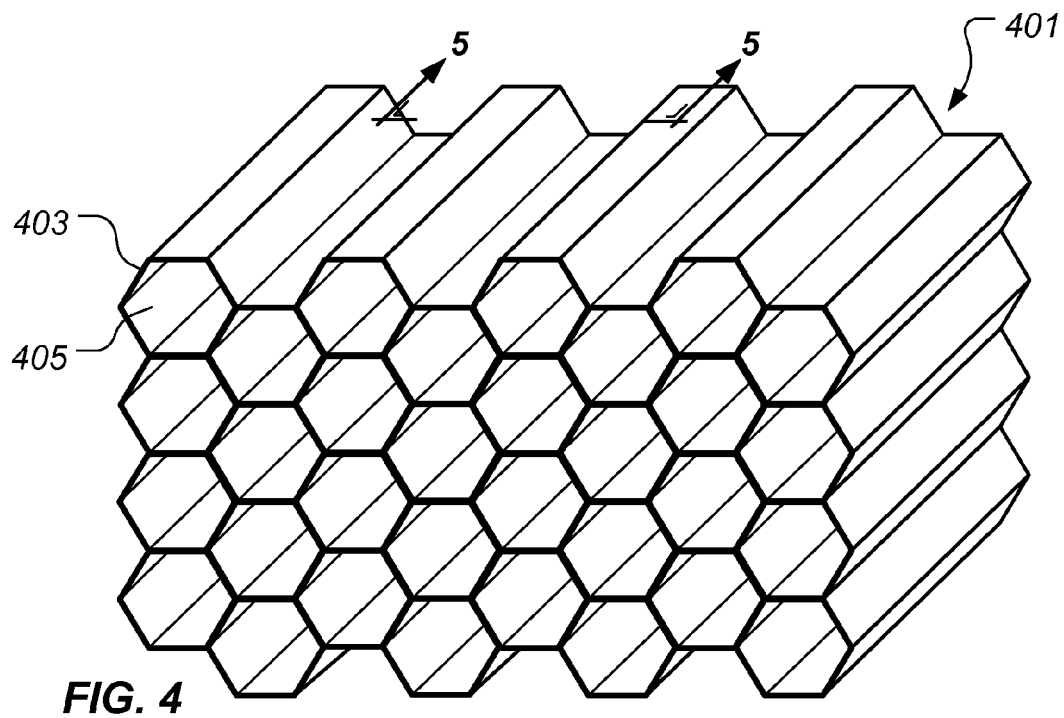
FIG. 4 is a perspective view of a composite core, according to one example embodiment.
Figure 5:
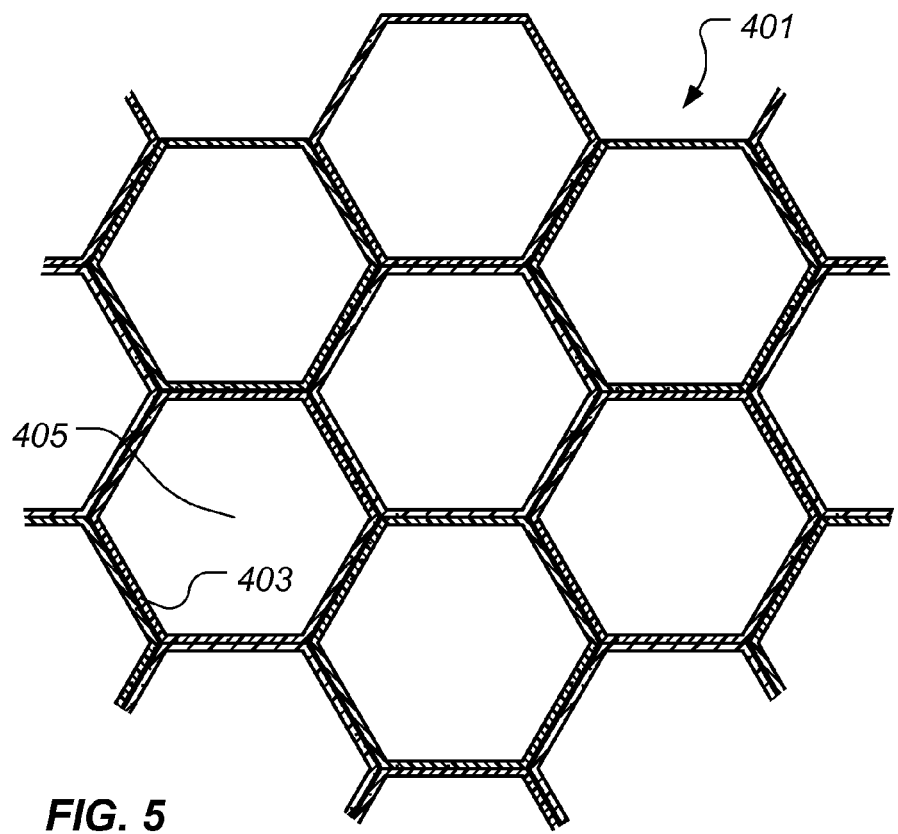
FIG. 5 is a cross-sectional view of the composite core, taken from section lines 5-5 in FIG. 4, according to one example embodiment.

Referring now also to FIGS. 4 and 5, composite core 401 is illustrated in a raw stock configuration. Composite core 305 (shown in FIG. 3), having implementation specific geometry, can be carved from composite core 401, for example. In another embodiment, composite core 401 is manufactured in a net shape such that a subsequent carving procedure is not required. Composite core 401 can be of a wide variety of materials and cell sizes. For example, in one embodiment composite core 401 is made from a carbon fiber and resin composite system. Composite core 401 includes a plurality of tubes 403 (only one tube labeled for clarity) arranged in a two-dimensional array. However, in one embodiment the tubes 403 can be selectively positioned such that the end portions are not in the same plane. Each tube 403 defines a passageway or "cell" 405 extending therethrough. Composite core 401 can comprise any suitable number, size, cross-sectional shape, and construction of tubes 403.

Each tube 403 of composite core 401 can include a plurality of reinforcement fibers disposed in a polymeric matrix. For example, tubes 403 may comprise fibers comprising one or more of carbon, graphite, glass, an aromatic polyamide (i.e., "aramid") material, a variant of an aromatic polyamide material (e.g., a polyparaphenylene terephthalamide material, such as Kevlar® by E. I. du Pont de Nemours and Company of Richmond, Va.), or the like. The scope of the present disclosure, however, encompasses fibers comprising any suitable material or combination of materials. The polymeric matrix may comprise any suitable resin system, such as a thermoplastic or thermosetting resin for example. Exemplary resins include epoxy, polyimide, polyamide, bismaleimide, polyester, vinyl ester, phenolic, polyetheretherketone (PEEK), polyetherketone (PEK), polyphenylene sulfide (PPS), and the like.

The fibers of tubes 403 may be oriented in one or more directions and may be woven or unwoven. It should be appreciated that tube 307 may alternatively only include fibers arranged in a single direction, such as a uniaxial or helical fiber configurations. In yet another embodiment, a first ply comprises fibers and a second ply comprises fibers, such that the second ply is laid-up over the first ply.

Figure 6:
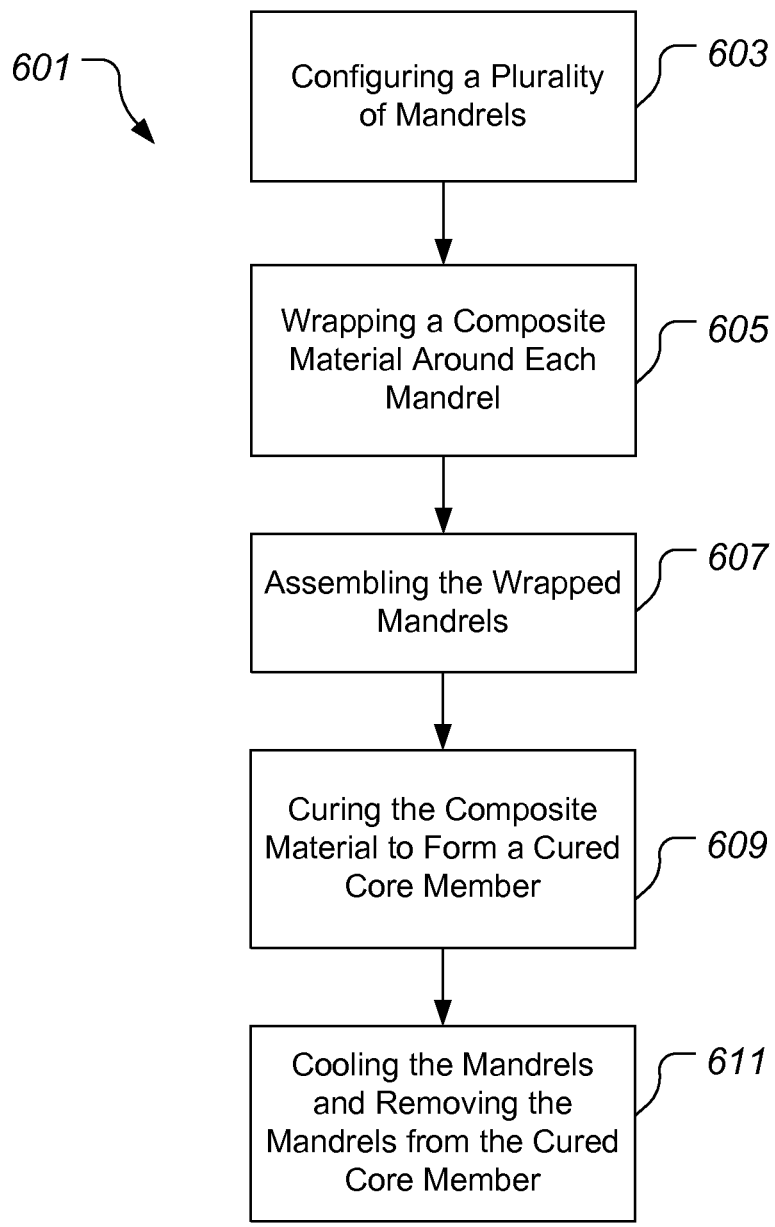
FIG. 6 is a schematic view of a method of manufacturing a composite core, according to one example embodiment.

Referring now also to FIG. 6, a method 601 of manufacturing a composite core, such as composite core 401, is schematically illustrated. Method 601 can include a step 603 of configuring a plurality of mandrels. A step 605 can include wrapping a composite material around each mandrel. A step 607 can include assembling the wrapped mandrels. A step 609 can include curing the composite material to form a cured core member. A step 611 can include cooling the mandrels and removing the mandrels from the cured core member. Each step of method 601 is described in further detail herein.

Figure 21:
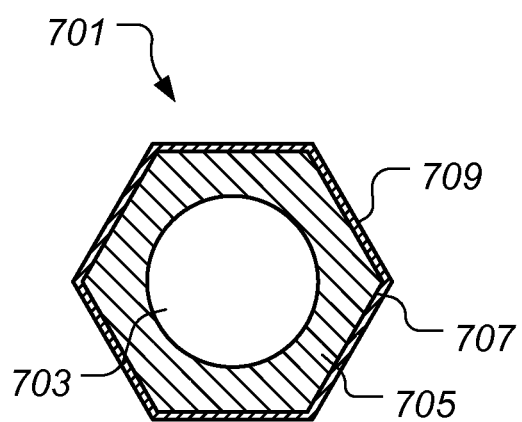
FIG. 21 is a cross-section view of a mandrel taken from FIG. 8, according to one example embodiment.

Referring to FIG. 21, a cross-sectional view through a mandrel 701 is illustrated. Step 603 includes configuring a plurality of mandrels. In the illustrated embodiment, mandrel 701 is a metallic mandrel, such an aluminum material. Mandrel 701 is configured having a material with a relatively low coefficient of thermal expansion (CTE). In the illustrated embodiment, mandrel 701 is preferably cured in a tool that utilizes a bladder or other device to apply pressure from the exterior. However, it should be appreciated that method 701 can also be configured with a material having a desired amount of CTE so that curing pressure is derived from a thermal expansion of the mandrels within a confining tool.

Mandrel 701 may be configured with a hollow portion 703 extending through the centerline length of mandrel 701, forming a body portion 705 between hollow portion 701 and outer surface 707. Mandrel 701 is configured so that during the curing process of the composite core 401, the temperature of each mandrel 701 is increased such that body portion 705 volumetrically expands uniformly both in an inward direction and an outward direction, until outer surface 707 is bounded by its nearest neighbor mandrel, at which point the pressure exerted by mandrel 701 on its nearest neighbor mandrel remains relatively constant, and the thermal expansion of body portion 705 continues primarily in inward direction. The degree of thermal expansion each mandrel 701 is dependent upon the CTE of the material of each mandrel 701. The geometry of mandrel 701 can be selected to tailor the physical properties of mandrel 701 and the resultant composite core 401. Further, the geometry of mandrel 701 can be selected to tailor the strength/stiffness of the mandrel 701. Further, the wall thickness of body portion 705, as well as the geometry of hollow portion 703, can be selectively controlled to produce a desired thermal expansion profile. For example, a mandrel having a smaller hollow portion 703 would provide a higher external pressure than mandrel 701. In the illustrated embodiment, hollow portion 703 is of a cylindrical shape; however, it should be appreciated that other embodiments may have non-cylindrical shapes.

Each mandrel 701 is configured with a hollow portion 703 which allows hot air to be ducted therethrough during the cure cycle, as discussed further herein. However, it should be appreciated that an alternative embodiment of mandrel 701 does not include a hollow portion 703. It should be appreciated that mandrel 701 is merely illustrative of a wide variety of mandrel configurations contemplated. Even though the exterior shape of the mandrels are illustrated as hexagonal, the present disclosure includes mandrels having other exterior shapes, such as square, rectangular, triangular, to name a few examples. Further, it should be appreciated that the hollow portion within the mandrels can be any variety of shape, or shapes. The exact shape of the hollow portion is implementation specific.

In one example embodiment, a Teflon® material, or other bond resistant material or coating, can be used to prevent the composite material from bonding to the exterior surface of mandrel 701 during the cure cycle. As such, each mandrel 701 can include a layer 709 of the bond resistant material adjacent to the outer surface 707 of each mandrel 701.

Referring again to FIG. 6, step 605 includes wrapping composite material around each mandrel, such as mandrel 701. The exact method of wrapping or otherwise depositing the uncured composite material on the exterior surface of each mandrel is implementation specific. In the preferred embodiment, one or more steps of method 601 are performed by an automated system; however, it should be appreciated that any of the steps can be performed manually.

Figure 7:
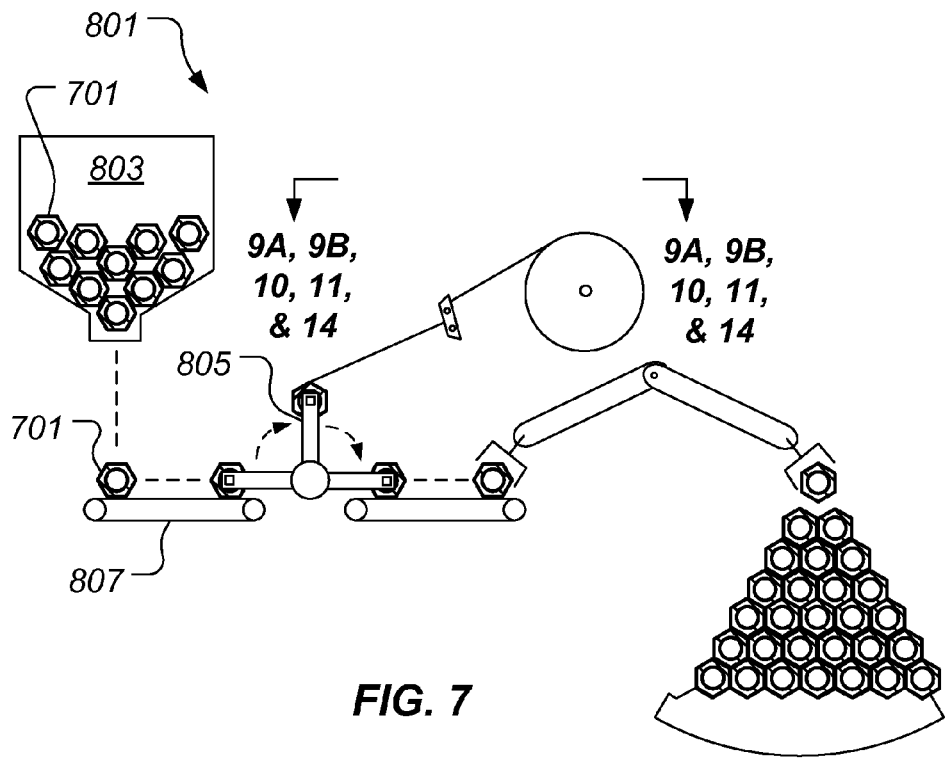
FIG. 7 is a partially stylized view of a system for wrapping and assembling mandrels, according to example embodiment.

Referring also to FIG. 7, a system 801 for at least partially performing one or more steps of method 601 is illustrated. Further, system 801 is particularly well suited for performed steps 605 and 607. Step 605 includes wrapping composite material around each mandrel. Step 607 includes assembling the wrapped mandrels. Each of steps 605 and 607, as well as system 801, are further described herein.

System 801 can include a hopper 803 configured to house a plurality of mandrels 701. Each mandrel 701 can be selectively deployed and captured by a winding jig 805. For example, each mandrel 701 can be released onto a conveyor 807 and picked up by the arms of winding jig 805.

Figure 8:
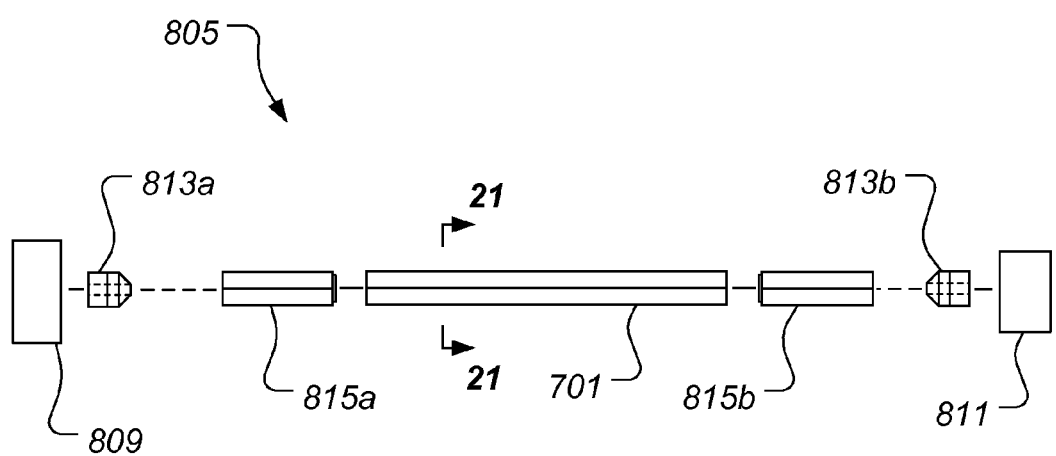
FIG. 8 is an exploded view of a mandrel winding jig, according to example embodiment.

Referring also to FIG. 8, an embodiment of winding jig 805 is illustrated. Winding jig 805 is configured to position and retain mandrel 701 for the depositing of composite material thereon. It should be appreciated that winding jig 805 can take on a variety of implementation specific configurations. In one embodiment, winding jig 805 can include a driver 809 and a support member 811. Adapters 813a and 813b are operably associated with driver 809 and support member 811, respectively. A coupling 815a is positioned between driver 809 and a first end portion of mandrel 701. Similarly, a coupling 815b is positioned between support member 811 and a second end portion of mandrel 701.

Winding jig 805 is configured to operably secure mandrel 701 between couplings 815a and 815b. Couplings 815a and 815b have similar geometry to that of mandrel 701. Further, winding jig 805 is configured such that the geometry of couplings 815a and 815b are aligned with mandrel 701 during the composite material winding process. In the illustrated embodiment, driver 809 is configured to drive the rotation of adapters 813a and 813b, couplings 815a and 815b, and mandrel, while support member 811 is configured to provide freewheeling support. In an alternative embodiment, mandrel 701 and couplings 815a and 815b are held stationary while a device operates to place the composite material about the mandrel and couplings 815a and 815b, as discussed further herein. It should be appreciated that winding jig 805 is merely illustrative of a fixture that can be used to facilitate the depositing of composite material onto mandrel 701 in step 605 of method 601.

Figure 9A:
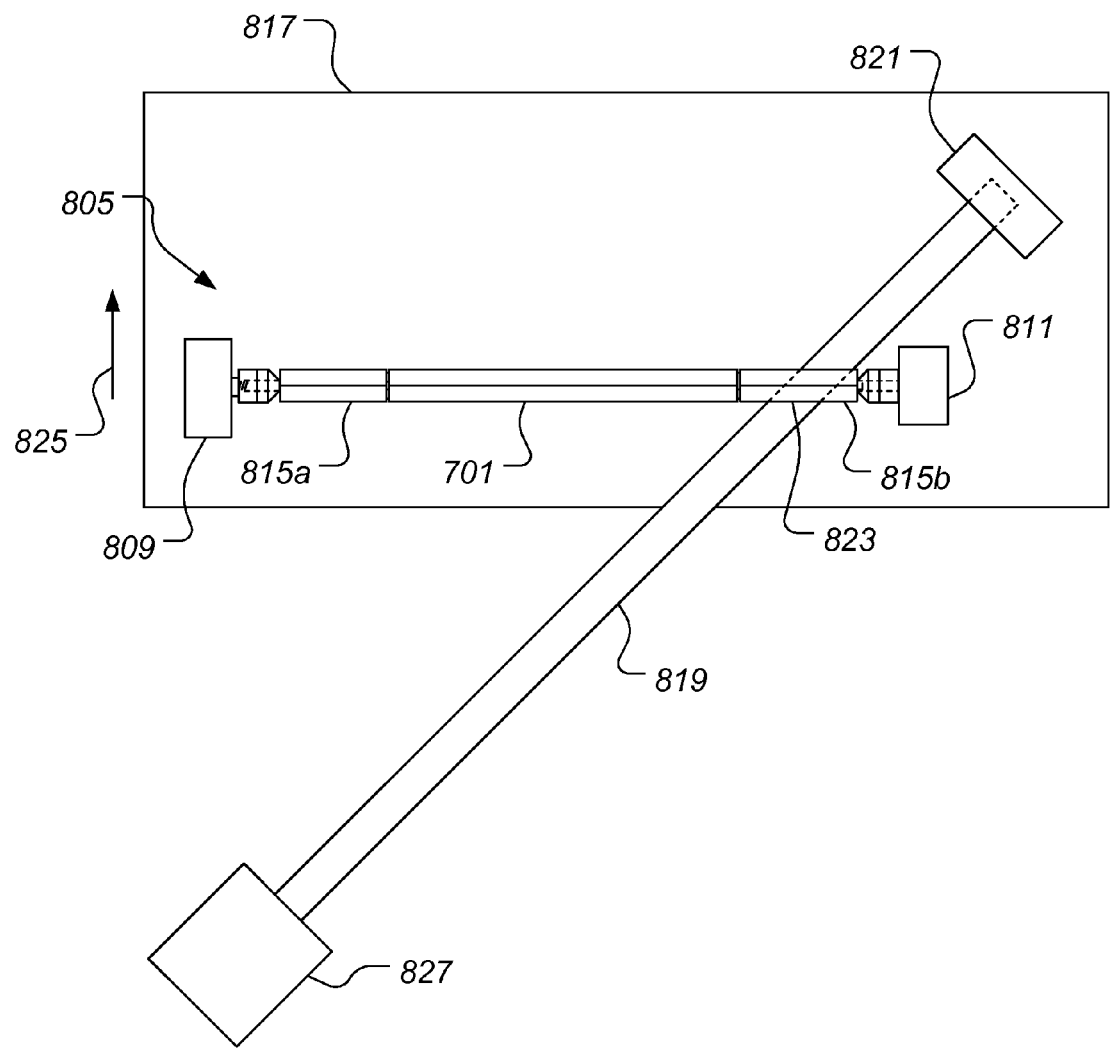
FIG. 9A is a top view of a winding jig, according to example embodiment.

Referring also to FIG. 9A, one non-limiting example embodiment of winding jig 805 for performing at least step 605 of method 601 is illustrated. Winding jig 805 is mounted to a platform 817 that can be translated along a prescribed path. A first end portion of slit 819 can be secured to a mount 821 that is secured to platform 817. Slit 819 is positioned through an opening 823 in coupling 815b. A second end portion of slit 819 can remain part of a roll 827 of composite material. In one embodiment, a plurality of cutting members cut roll 827 of composite material into a plurality of slits 819 at prescribed widths, each slit 819 being fed to different winding jigs 805. Platform 817 is biased in direction 825 by a constant tension member such that slit 819 is held in tension. Mount 821 and roll 817 are positioned so that slit 819 is oriented at a desired angle relative to mandrel 701. In the illustrated embodiment, the desired angle of slit 819 is 45 degrees; however, slit 819 can be oriented at any desired angle.

Figure 9B:
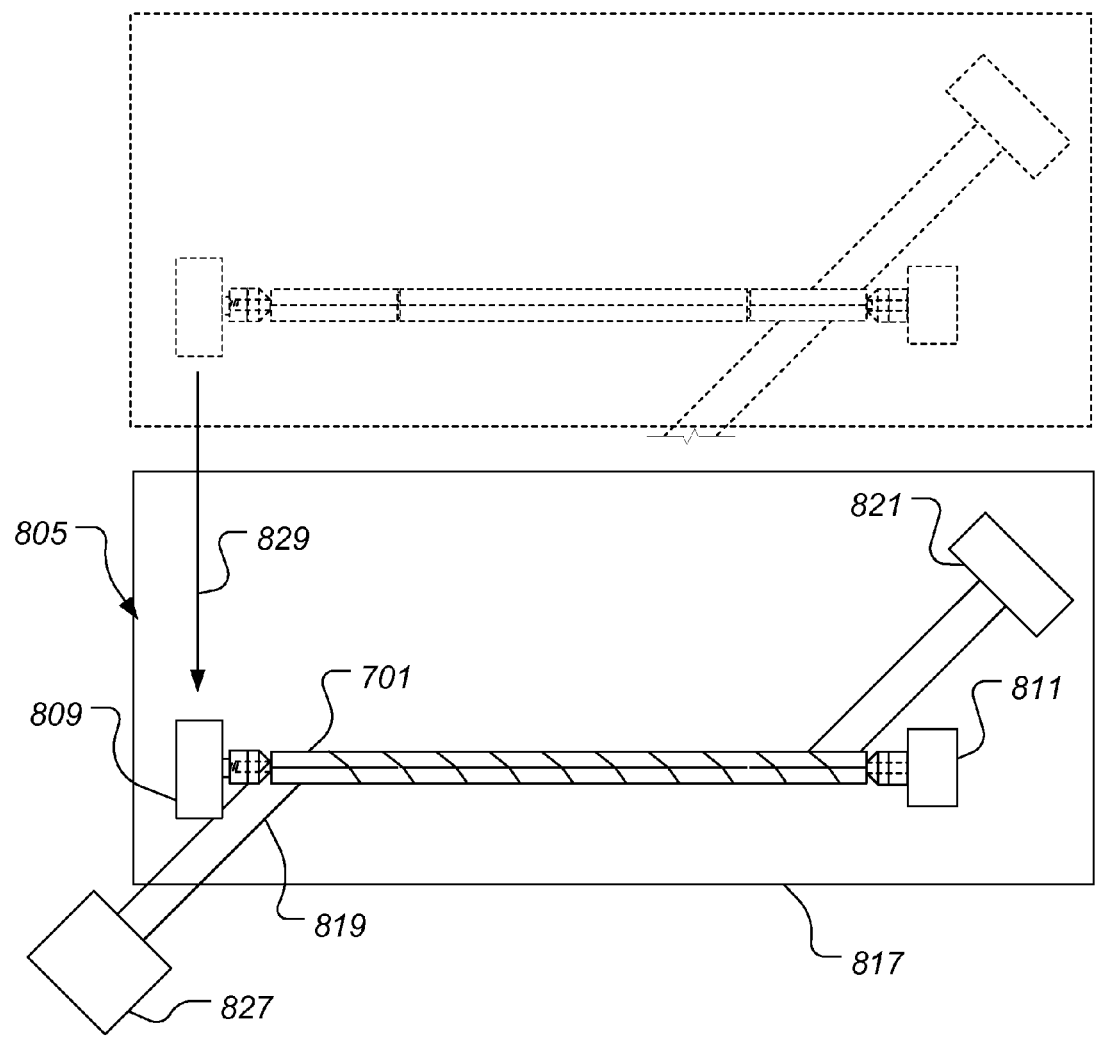
FIG. 9B is a top view of a winding jig, according to example embodiment.

Referring also to FIG. 9B, the operation of winding jig 805 is illustrated. Driver 809 is operated so as to cause mandrel 701 to rotate, which causes slit 819 to wrap around mandrel 701. As slit 819 wraps around mandrel 701, platform 817 is pulled toward roll 817 in direction 829 while the wrap angle is maintained.

Figure 10:
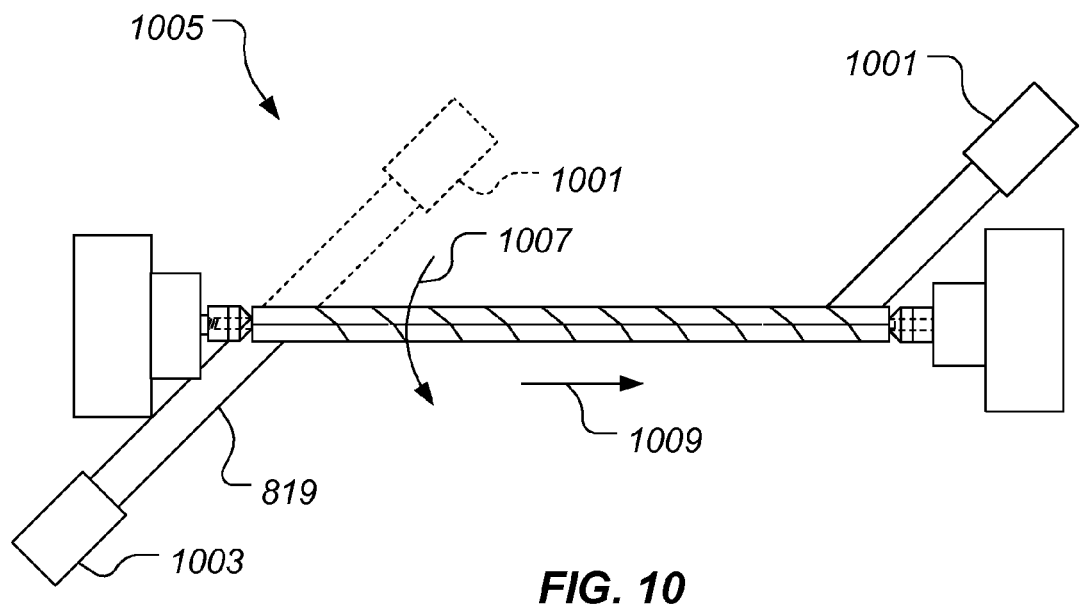
FIG. 10 is a top view of a winding jig, according to example embodiment.

Referring also to FIG. 10, another example embodiment of a winding jig 1005 for wrapping composite material on each mandrel 701 in step 605 is illustrated. Winding jig 1005 is substantially similar to winding jig 805; however, winding jig 1005 is configured so that mandrel 701 is held stationary while a material placement head 1001 moves around mandrel 701, as well as translates along an axis of mandrel 701, such as in directions 1007 and 1009, respectively. Material placement head 1001 is configured to feed composite material while moving in a prescribed path. In such an embodiment, slit 819 can be secured at a stationary mount 1003 so that slit 819 can be placed in tension by material placement head 1001 as slit 819 is wrapped around mandrel 701.

Figure 11:
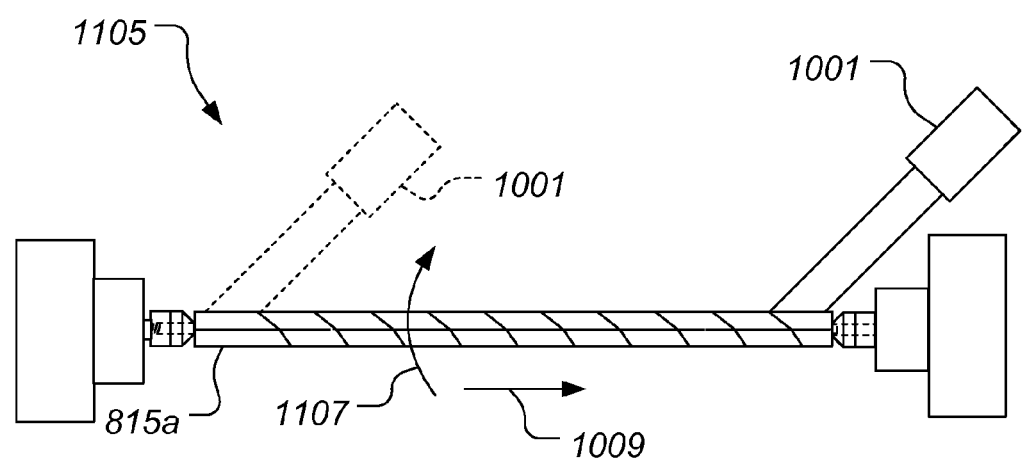
FIG. 11 is a top view of a winding jig, according to example embodiment.

Referring also to FIG. 11, another example embodiment of a winding jig 1105 for wrapping composite material on each mandrel 701 in step 605 is illustrated. Winding jig 1105 is substantially similar to winding jig 1005; however, winding jig 1105 is configured so that mandrel 701 is rotated in a direction 1107 while material placement head 1001 translates along an axis of mandrel 701 corresponding with direction 1009. In such an embodiment, slit 819 can be secured to coupling 815a, for example, so that tension can be formed in slit 819 as material placement head 1001 translates and mandrel 701 rotates.

In another example embodiment, the winding jig is configured to translate along a direction corresponding with the axis of mandrel 701 while material placement head 1001 rotates but does not translate.

It should be appreciated that the winding jig can be configured in any combination of the configurations described herein. For example, mandrel 701 can rotate in a first rotational direction while material placement head 1001 rotates around mandrel 701 in an opposite direction to that of the first rotational direction. Further, either mandrel 701 can translate along its axis or the material placement head can translate in a direction corresponding to the mandrel axis, or any combination thereof.

It should be appreciated that the exact system and method for depositing raw composite material on mandrel 701 can be dependent at least upon the material form of the raw composite material.

Figure 12:
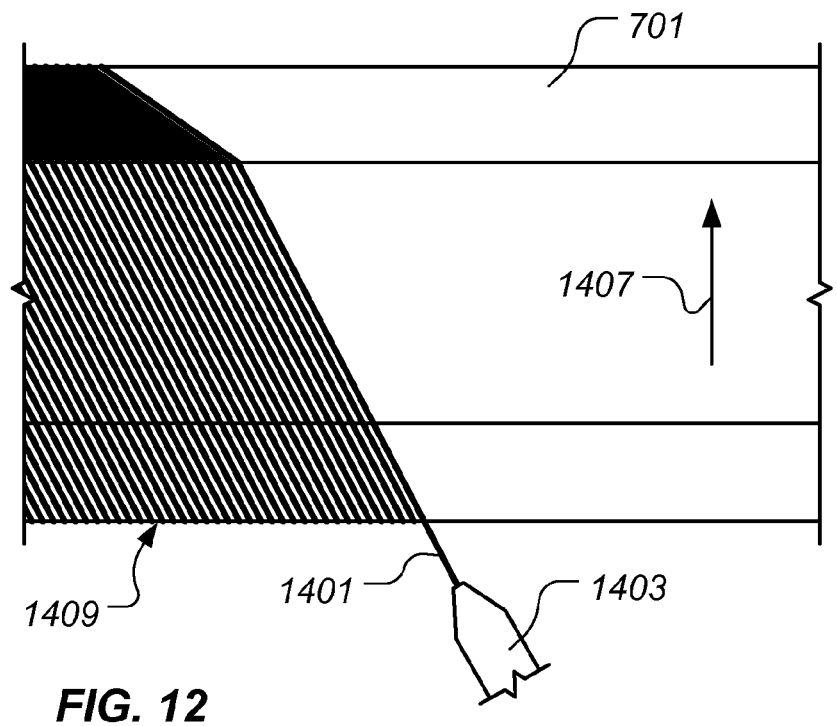
FIG. 12 is a stylized, plan view of a mandrel being wrapped with uncured composite material, according to one particular embodiment.

Referring also to FIG. 12, one technique of wrapping uncured composite material around mandrel 701 utilizes a filament winding process. A continuous, resin-impregnated fiber 1401, extending from a filament winding machine 1403, is wound about mandrel 701. The resin can be either a thermosetting or thermoplastic resin and becomes the polymeric matrix of tube 403 upon curing. The material placement process may be conducted in a variety of processes; for example, mandrel 701 can move axially while a spool of fiber 1401 rotates around the mandrel 701, as indicated by an arrow 1407. Alternatively, a spool or a plurality of spools of material could rotate around mandrel 701. Relative motion of the material dispensing mechanism to mandrel 701 is inferred. As fiber 1401 is wound onto mandrel 701 by filament winding machine 1403, a helical shaped pattern is formed. One or more plies 1409 of fiber 1401, in desired orientations with respect to mandrel 701, are wound onto mandrel 701 to form the basic geometry of tube 403. The angle of which fiber 1401 is wound about mandrel 701 may vary along the length of the mandrel 701 in order to customize the strength of core 401. For example, the angle of the fiber 1401 may be dynamically changed during the material placement process in order to customize a compressive strength of the core. Note that, in the illustrated embodiment, mandrel 701 exhibits a size and shape corresponding to cell 405 (see FIG. 4 or 5). It should be further noted; however, that the present disclosure is not limited to the particular illustrated configurations of filament winding machine 1403 or mandrel 701. Mandrel 701 and the one or more plies 1409 that have been filament wound onto mandrel 701 are subsequently assembled with other mandrels and plies, as will be discussed in greater detail herein, to form core 401 (shown in FIG. 4). It should further be appreciated that upon cutting of plies 1409 and the mandrel 701, the material may have a tendency to un-wind. A band of material, potentially adhesive or fibrous, may be used to keep fiber 1401 from unraveling upon cutting of the plies 1409 and the mandrel 701. An adhesive material with unidirectional fibers could be used to band the fiber 1401 on mandrel 701. Further, the band can be selectively located and used to provide extra support for a subsequent post processing procedure of the core, such as a machining process.

Figure 13:
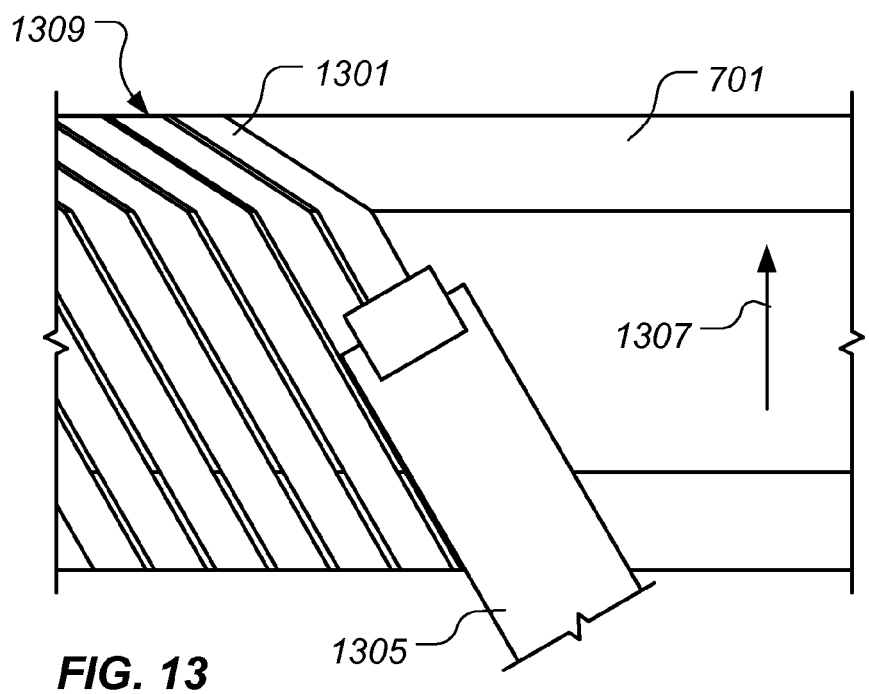
FIG. 13 is a stylized, plan view of a mandrel being wrapped with uncured composite material, according to one particular embodiment.

In yet another example technique of performing step 605 of method 601, shown in FIG. 13, wrapping uncured composite material around mandrel 701 is performed using a fiber placement process. A continuous, resin-impregnated tow 1301 (only one labeled for clarity) of approximately, but not limited to, 1000 fibers is applied to a mandrel 701 by a fiber placement machine 1305. It should be appreciated that tow 1301 may also be portions of a full tow; for example, tow 1301 may be a half tow of 500 fibers. In lieu of a tow 1301, a tape of fibers, cut to a prescribed width, may be used. A pre-cut tape of fibers may be referred to as a "slit-tape." A slit-tape allows the user to more closely control the width dimension, as compared to a tow of fibers. Exemplary prescribed widths of slit-tape include ⅛" and ¼", to name a few. The resin can be a thermosetting or thermoplastic resin, to name two examples, and becomes the polymeric matrix of tube 403 upon curing. During the fiber placement process, mandrel 701 can move axially while tow 1301 rotates around the mandrel 701, as indicated by an arrow 1307. As tow 1301 is applied to mandrel 701 by fiber placement machine 1305, a helical shaped pattern is formed. One or more plies 1309 of tow 1301, in desired orientations with respect to mandrel 701, are wound onto mandrel 701. In one embodiment, one or more non-helical plies layers may be assembled on mandrel 701 to customize mechanical properties in certain directions. It should be appreciated that more than one tow 1301 or slit-tape of different materials may be used. Note that, in the illustrated embodiment, mandrel 1303 exhibits a size and shape corresponding to cell 405 (see FIG. 4 or 5). It should be further noted, however, that the present disclosure is not limited to the particular illustrated configurations of fiber placement machine 1305 or mandrel 701. Mandrel 701 and the one or more plies 1309 that have been fiber placed onto mandrel 701 are subsequently assembled with other mandrels and plies, as will be discussed in greater detail below, to form core 401 (shown in FIG. 4).

Figure 14:
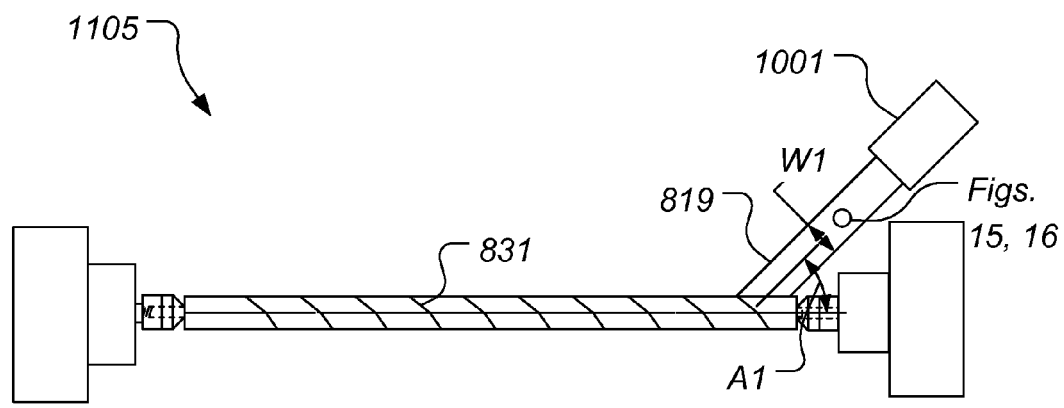
FIG. 14 is a top view of a winding jig, according to example embodiment.
Figure 15:
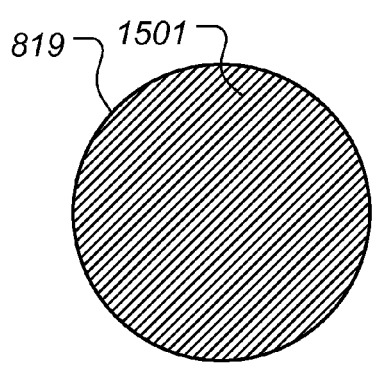
FIG. 15 is a detail view taken from FIG. 14, according to one example embodiment.
Figure 16:
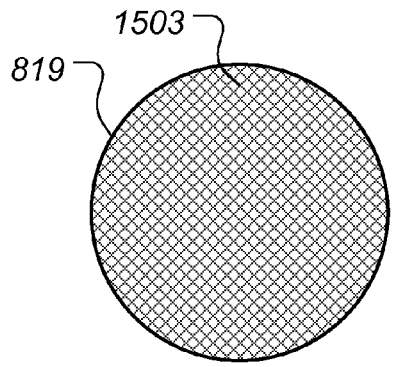
FIG. 16 is a detail view taken from FIG. 14, according to one example embodiment.

Referring now also to FIGS. 14-16, one example embodiment of step 605 includes wrapping mandrel 701 with a broadgood form of slit 819 in such a procedure that results in solid passageway or "closed cell" geometry. Namely, the broadgood form of slit 819 has a width W1 that is selected to prevent a gap or space in the slit 819 after slit 819 is wrapped around mandrel 701. Further, as slit 819 is wrapped around mandrel 701, a continuous seam 831 is formed; however, seam 831 is not a gap or space in the material, rather seam 831 represents an abutment of helically wrapped material, such as slit 819, which is an example of a customized width broadgood composite material. In contrast, the wrapping of a mandrel with composite material that produces a gap or space in the material, or an "open cell" geometry, as described with regard to FIGS. 12 and 13, can have undesirable attributes in certain implementations. For example, the "open cell" embodiment may be limited by the widths of the tows or slits having to be consistent, resulting in having only a fixed whole number of tows for a given spacing and angle, and the gaps having to be a uniform width. The result is only having a fixed whole number of materials for a given spacing and angle. The angle with which the tow or slit is wrapped cannot be varied infinitely and still retain a specific tow or slit width and spacing. Furthermore, an "open cell" geometry core can be undesirable in some panel implementations because of insufficient bond surface at the core/skin interface. Further, for a given mandrel geometry there are a limited number of tow or slit width and gap combinations that will satisfy construction of the core tube for a given wrap angle.

Referring in particular to FIGS. 15 and 16, the orientation fibers 1501 of slit 819 is implementation specific. In the embodiment illustrated in FIG. 15, fibers 1501 are unidirectional such that all the fibers extend in a direction corresponding with the length of the slit 819. In the embodiment illustrated in FIG. 16, fibers 1501 are multidirectional so as to form a fabric configuration.

Figure 17:
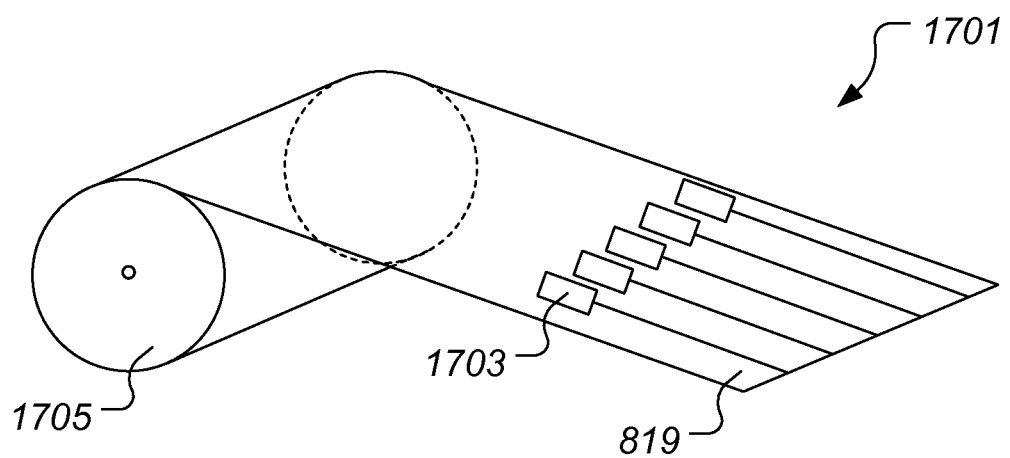
FIG. 17 is a perspective view of a cutting tool, according to one example embodiment.

Still referring to FIGS. 14-16, a nominal width W1 of slit 819 can be calculated by multiplying the circumference of the exterior surface of mandrel 701 by the cosine of the wrap angle A1. One major advantage of using slit 819 to wrap mandrel 701 without material gaps is that the angle A1 can be customized for the core implementation while simply adjusting for the width W1 of slit 819. Furthermore, the slit 819 can be cut off from a much wider roll of bulk raw material, such that the customization of width W1 can be simply a matter of adjusting the cutting tool to provide the implementation specific width. Customizing the angle A1 allows a user to tailor the physical properties of the core by orienting the fibers 1501 in a direction to produce said physical properties. Referring briefly to FIG. 17, an example cutting tool 1701 is illustrated. Cutting tool 1701 can have a plurality of cutting members 1703, such as blades, that can be oriented to cut slits 819 at prescribed widths from a raw material roll 1705. Each slit 819 can be communicated to a winding jig 805, as discussed further herein. Cutting tool 1701 is especially well suited for cutting slits 819 having unidirectional fibers such that cutting members 1703 cut the raw material along between adjacent fibers. In contrast, a cutting tool having a male/female press cutting members may be better suited for cutting slits 819 having multidirectional fibers.

Still referring to FIGS. 14-16, the "closed cell" geometry core produced by wrapping broadgood composite material in step 605 of method 601 enables the use of much thinner and lighter composite material, thereby producing a core with very low density. Further, the "closed cell" geometry core can have significantly higher stiffness and strength than is achievable with "open cell" geometry core. Furthermore, "closed cell" geometry core is fully tailorable.

In another embodiment of step 605 of method 601, mandrel 701 is wrapped multiple times to produce multiple layers of composite material layers. In such an embodiment, the fiber orientation, wrap angle, and/or wrapping direction can be varied to produce tailored mechanical and physical properties.

In some situations it may be desirable to provide ventilation and/or drainage in the composite core, such as in a wing member of an aircraft that also functions as a fuel tank. In such an embodiment, step 605 of method 601 can also include creating perforations in the raw material or slit 819. The perforations can be created by any variety of methods; one method can be running the raw material or slit 819 over a spiked wheel or spiked roller support, for example.

Figure 18:
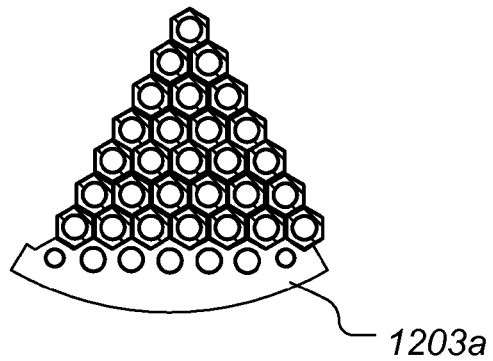
FIG. 18 is a is an end view of a plurality of composite-wrapped mandrels stacked on a partial tool, according to one example embodiment.
Figure 19:
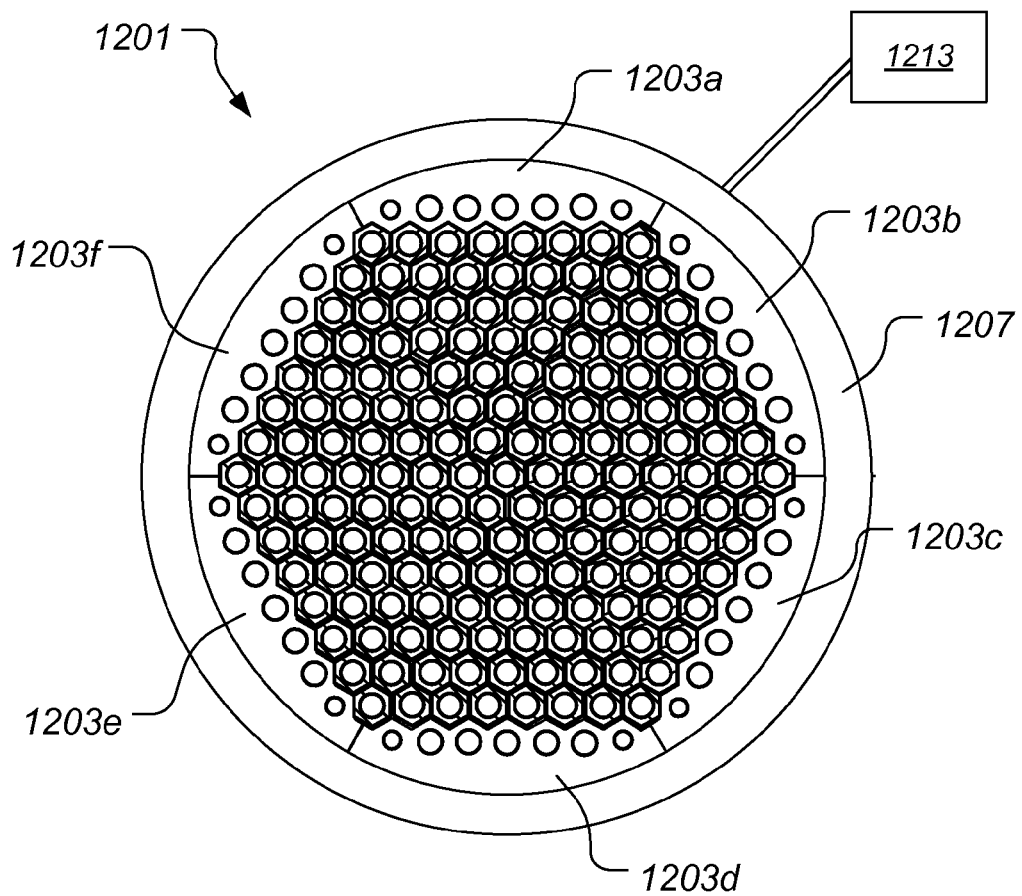
FIG. 19 is an end view of a plurality of composite-wrapped mandrels assembled in a tool, according to one example embodiment.
Figure 20:
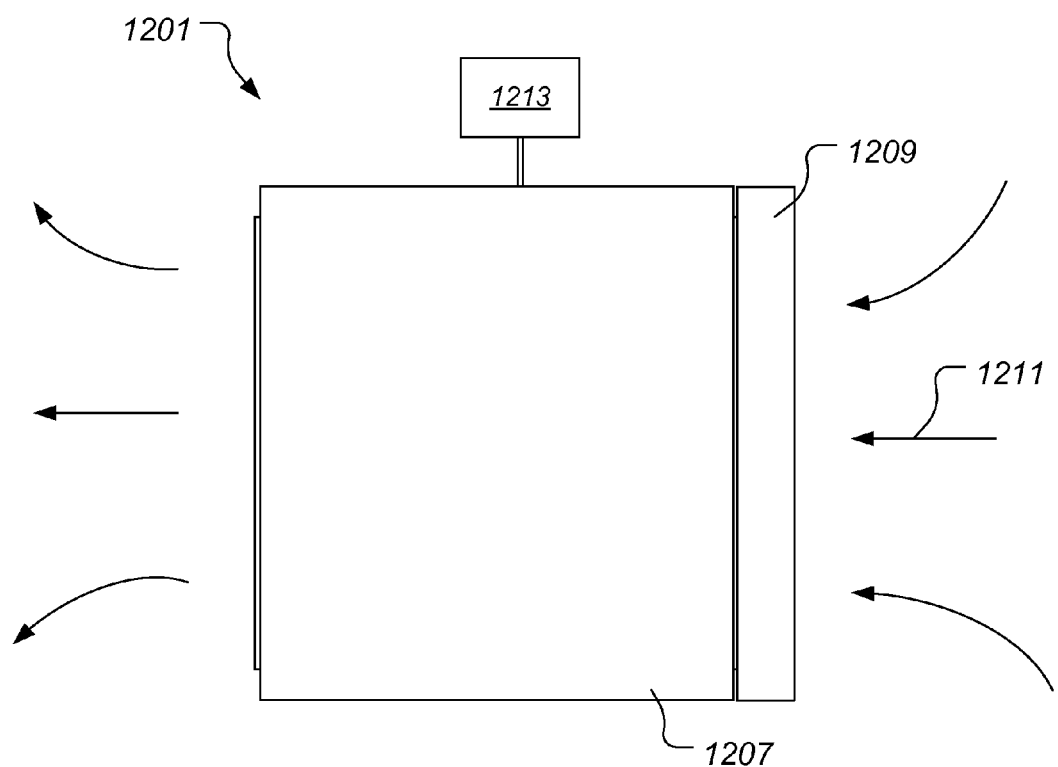
FIG. 20 is a plan view of a plurality of composite-wrapped mandrels assembled in a tool, according to one example embodiment.

Referring again to FIGS. 6 and 7, step 607 of method 601 includes assembling the wrapped mandrels. Step 607 can further include assembling and inserting the wrapped mandrels in a tool or other fixture. The exact configuration of the tool is implementation specific. Referring now also to FIGS. 18-20, an example of a tool 1201 is illustrated. Tool 1201 is configured to produce a hexagonal shaped core member; however, tool 1201 can be configured to provide any desirable shape. For example, alternative shapes of tool 1201 can be configured to produce circular, square, rectangular, or even part customized core shapes. In the illustrated embodiment, the plurality of mandrels 701 having wrapped composite material are assembled onto partial tool members 1203a-1203f in a pyramid shape. In one embodiment, system 801 is configured to automate the assembly and stacking of wrapped mandrels, as shown in FIG. 7. In another embodiment, the assembly and stacking of wrapped mandrels can be performed manually. Each partial tool member 1203a-1203f can include apertures 1205 to control and tailor any thermal expansion of the partial tool member 1203a-1203f during the cure process. In one embodiment, each partial tool member 1203a-1203f is stacked with seven levels of wrapped mandrels. Upon assembling each partial tool member 1203a-1203f and their wrapped mandrels, one additional wrapped mandrel 1205 is located in the center. However, it should be appreciated that each partial tool member 1203a-1203f may be stacked with wrapped mandrels and assembled in a variety of ways.

In one example embodiment, tool 1201 includes a bladder 1207 that is configured to inflate to provide a prescribed inward pressure upon the assembly of wrapped mandrels 701. However, it should be appreciated that the present disclosure contemplates other methods of providing pressure to the composite material wrapped around each mandrel 701 during the curing process, such as mechanical pressure generating devices.

In another embodiment, curing pressure can be generated by the thermal expansion of the mandrels 701. In such an embodiment, tool 1201 can include a rigid constraining structure in lieu of bladder 1207. The heating of the mandrels 701 causes thermal expansion, which generates pressure at the composite material between mandrels 701.

Tool 1201 can include a blower 1209 for generating an airflow 1211 and evenly distributing the airflow through the interiors of the plurality of mandrels 701. In an alternative embodiment, a fluid, such as an oil, is circulated through the interiors of the plurality of mandrels 701. Step 609 can include heating the wrapped mandrels within tool 1201 for a prescribed duration in accordance with the cure requirement of the composite system. An oven can be used to generate that requisite heat, for example. Airflow 1211 can improve the heating rate and heat distribution to the composite material wrapped around each mandrel 701, as such; it is particularly desirable to have an interior opening through each mandrel 701 that is sized to accommodate a prescribed amount of airflow. Bladder 1207 can be controlled by a controller 1213 so as to tailor the amount and timing of pressure exerted at the cell walls of composite material between mandrels 701 within tool 1201.

Referring again to FIG. 6, step 609 of method 601 includes curing the composite material wrapped around the mandrels 701 to form the cured composite core 401. As discussed further above, the uncured composite material around each mandrel 701 is cured by subjecting the assembly to the requisite temperature and pressure. As discussed above, the temperature and rate of temperature change of the composite material can be controlled in part by blowing hot air through the interior of mandrels 701. During the curing process of step 609, the temperature and pressure exerted upon the composite material is implementation specific. Bladder 1207 can be controlled by controller 1213 so as to tailor the amount and timing of pressure exerted at the cell walls of composite material between mandrels 701 within tool 1201. For example, bladder 1207 can be controlled by controller 1213 to change the amount of pressure during a viscosity change of the resin in the composite material.

After the cure cycle is complete, a composite core 401 is achieved as the uncured composite material around each mandrel 701 becomes rigidly bonded to each adjacent tube 403. It should be noted that composite core 401 that is formed by wrapping mandrels 701 with unidirectional fiber slits 819 at a prescribed angle produces composite core 401 that has cross-linked fibers at the cell walls. For example, multiple mandrels 701 wrapped at a wrap angle of +45 degrees with slits 819 having unidirectional fibers will produce cured composite core 401 with cell walls having two plies of fibers at 90 degrees to each other. This unique result of the method and system of the present disclosure produces a very lightweight and strong composite core 401.

Still referring to FIG. 6, step 611 of method 601 includes cooling mandrels 701 and removing mandrels 701 from the composite core 401.

It should be appreciated that method 601, and the process related systems disclosed above are merely illustrative of one exemplary method for manufacturing composite core 401. Furthermore, the post-cure processing methods and systems disclosed herein can be utilized for post-cure processing of composite core 401 made from any suitable manufacturing process.

Figure 22:
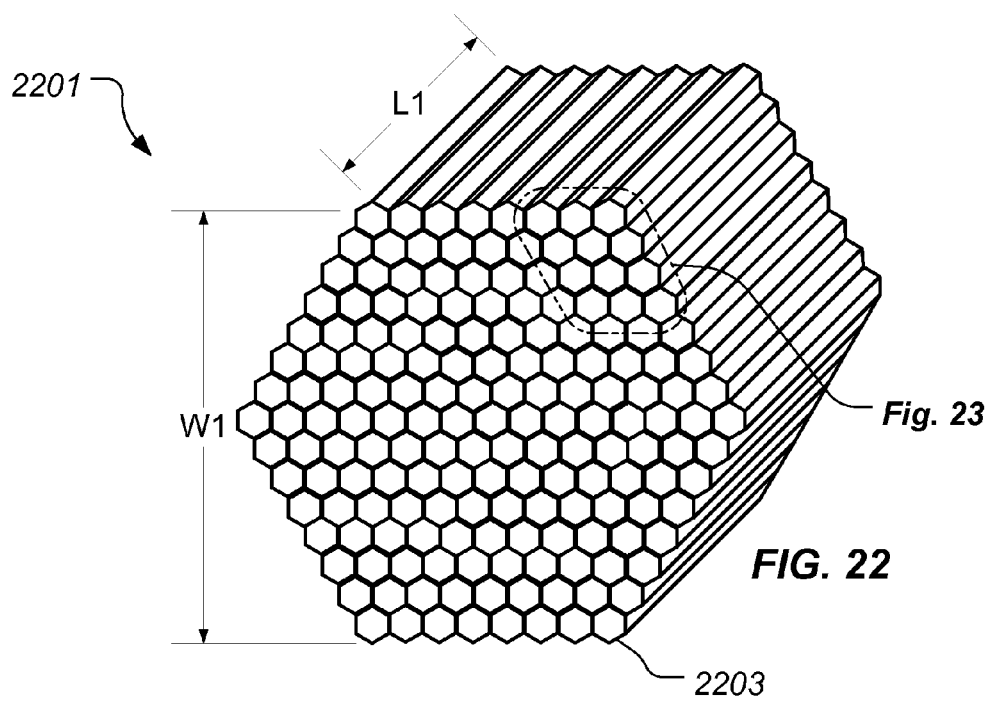
FIG. 22 is a perspective view of a bulk composite core, according to one example embodiment.
Figure 23:
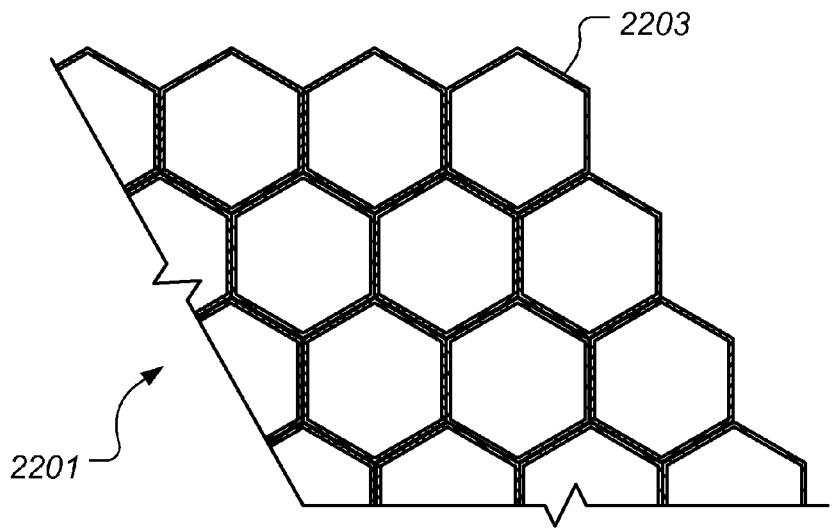
FIG. 23 is a detail view of the bulk composite core taken from FIG. 22, according to one example embodiment.

Referring to FIGS. 22 and 23, a bulk composite core 2201 has an outer hexagonal shape corresponding with a tool having an inner hexagonal shape, such as tool 1201 illustrated in FIG. 19. Further, bulk composite core 2201 is substantially similar to composite core 401, discussed further herein. For example, bulk composite core 2201 has a plurality of tubes 2203 forming a plurality of cells. The post-cure processing methods and systems of the present disclosure are discussed herein with regard to bulk composite core 2201; however, it should be appreciated that the post-cure processing methods and systems disclosed herein are applicable to other bulk composite core shapes, as well composite core having other cell member shapes.

The present disclosure includes methods and systems for efficiently and effectively cutting wafers from the bulk composite core 2201. Bulk composite core 2201 is typically produced with an overall size that is larger than required for an implementation; for example, bulk composite core 2201 can have a width W1 of approximate 18 inches and tube lengths L1 of 30 inches. However, it should be appreciated that composite core 2201 can be of any practical size.

Figure 24:
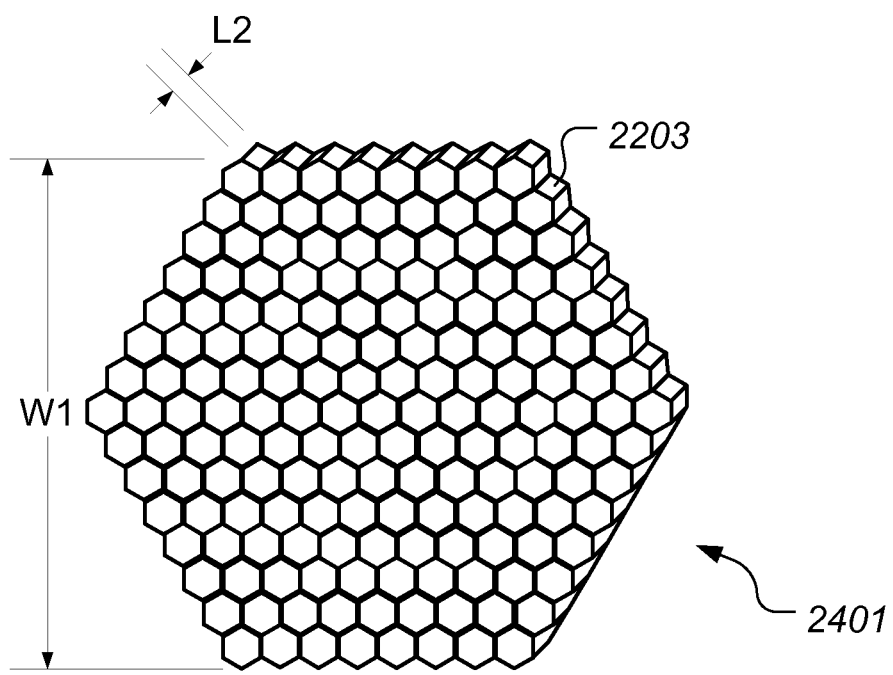
FIG. 24 is a perspective view of a wafer, according to one example embodiment.

Referring now also to FIG. 24, one embodiment of a wafer 2401 is illustrated. Wafer 2401 is a product cut from bulk composite core 2201. In the illustrated embodiment, the tube lengths L2 are approximately ½ inch. However, it should be appreciated that tube lengths L2 can be of any implementation specific size. For example, a wafer 2401 for use in a wing structure may have tube lengths L2 of 8 inches. One object of the present disclosure is to efficiently achieve a high yield of quality wafers 2401 from a bulk composite core 2201.

It should be appreciated that wafers 2401 may be cut from bulk composite core 2201 using any suitable cutting device. For example, exemplary cutting devices may include a band saw, a circular cutting blade, a circular grinding blade, a rope saw, to name a few examples.

Referring again to FIGS. 22 and 23, bulk composite core 2201 has an outer shape of a hexagon that can particularly benefit from the methods and systems disclosed herein. Since the hexagonal bulk composite core 2201 has a non-uniform cross-section, cutting induced forces (such as compression along W1) can cause distortion that may adversely affect the quality of a wafer 2401 cut therefrom. Not only may bulk composite core 2201 have a tendency to compress during the cutting operation, but bulk composite core 2201 may also have a tendency to torsionally twist when subjected to cutting forces.

Figure 25:
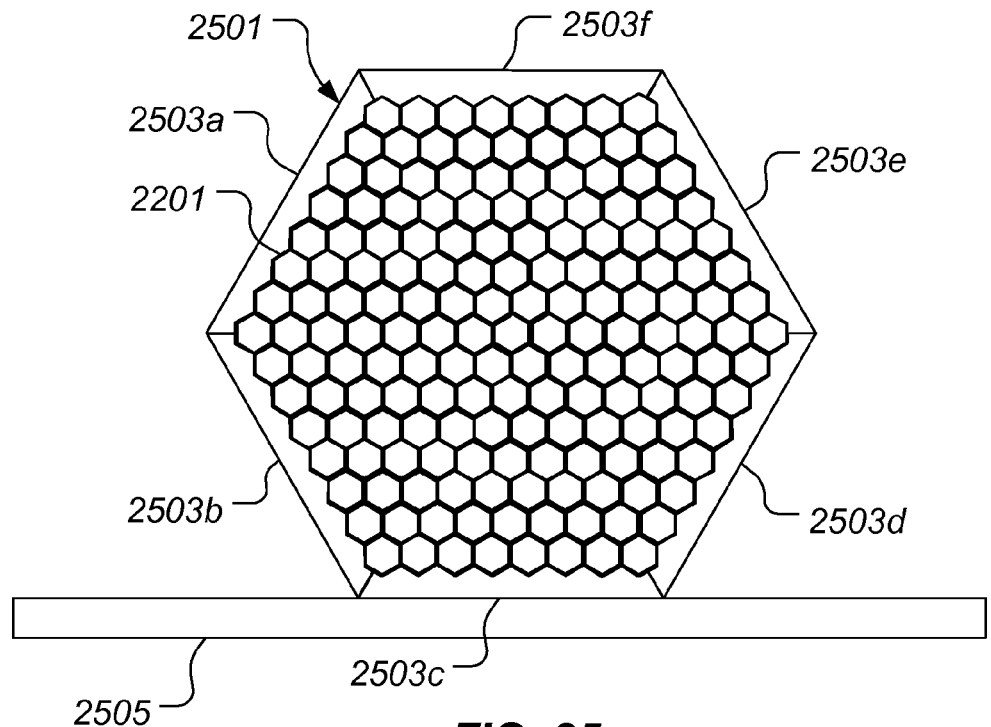
FIG. 25 is a front view of a fixture for supporting a bulk composite core, according to one example embodiment.
Figure 26:
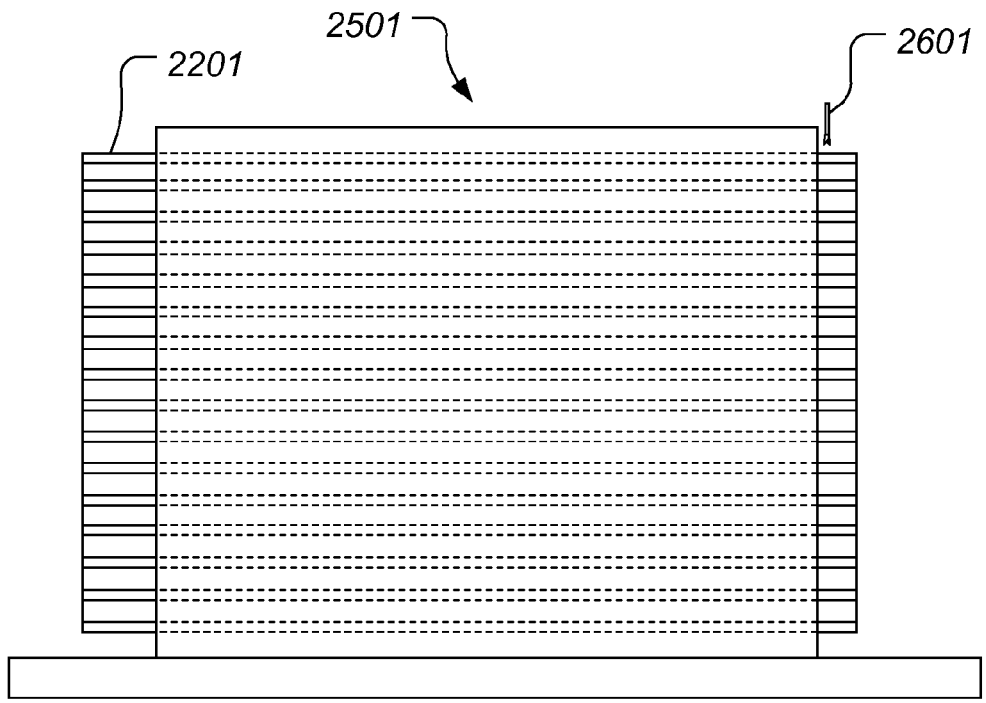
FIG. 26 is a side view of a fixture for supporting a bulk composite core, according to one example embodiment.

Referring now also to FIGS. 25 and 26, a fixture 2501 configured for supporting a bulk composite core 2201 during a cutting operation, is illustrated. Fixture 2501 includes partial sections 2503*a*-2503*f* that collectively form an outer support for bulk composite core 2201. Each partial section 2503*a*-2503*f* is a rigid member that can be coupled together to form interior surfaces that are adjacent to the exterior surfaces of bulk composite core 2201. In the illustrated embodiment, the exterior surfaces of bulk composite core 2201 are outer flat surfaces of the outer hexagonal shaped tube members 2203. Thus, the interior surfaces of partial sections 2503*a*-2503*f* mirror the outer flat surfaces of the outer hexagonal shaped tube members 2203. Fixture 2501 can be mounted to a support 2505 for stabilization.

During operation, bulk composite core 2201 can be positioned within fixture 2501 so as to partially expose a desired amount so that a cutter 2601 can cut a wafer 2401 to a desired length L2. In the illustrated embodiment, cutter 2601 is a band saw blade; however, cutter can be any device capable of cutting bulk composite core 2201. As cutter applies cutting relates forces upon bulk composite core 2201 adjacent to an exposed portion of fixture 2501, fixture 2501 keeps composite core 2201 from compressing as well as torsional twisting.

Figure 27:
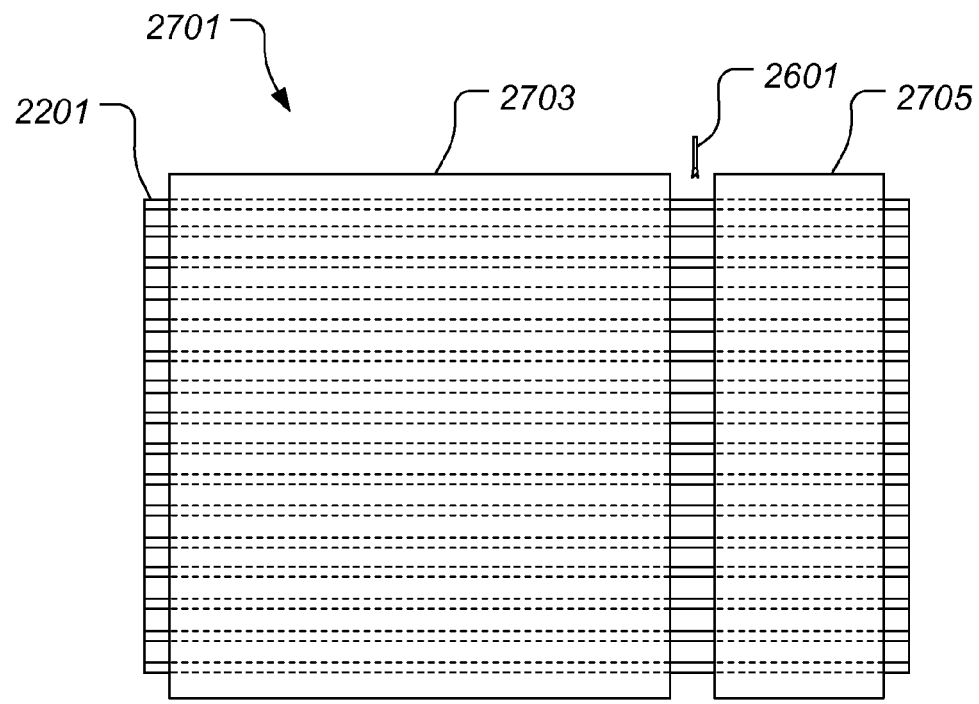
FIG. 27 is a side view of a fixture for supporting a bulk composite core, according to one example embodiment.

Referring now also to FIG. 27, an alternative embodiment of fixture 2501 is illustrated as a fixture 2701. Fixture 2701 is substantially similar to fixture 2501, except for having a multiple fixture segments, such as fixture segments 2703 and 2705. During operation, cutter 2601 can cut the bulk composite core 2201 between the fixture segments 2703 and 2705. Fixture 2701 may be particularly well suited for support of bulk composite core 2201 for the cutting of relatively large wafers 2401. Further, fixture 2701 can have any number of fixture segments that have any number of sizes. For example, it may be desirable to cut multiple wafers 2401 from one or more bulk composite cores 2201 at the same time, in which fixture 2701 can be adapted accordingly.

Figure 28:
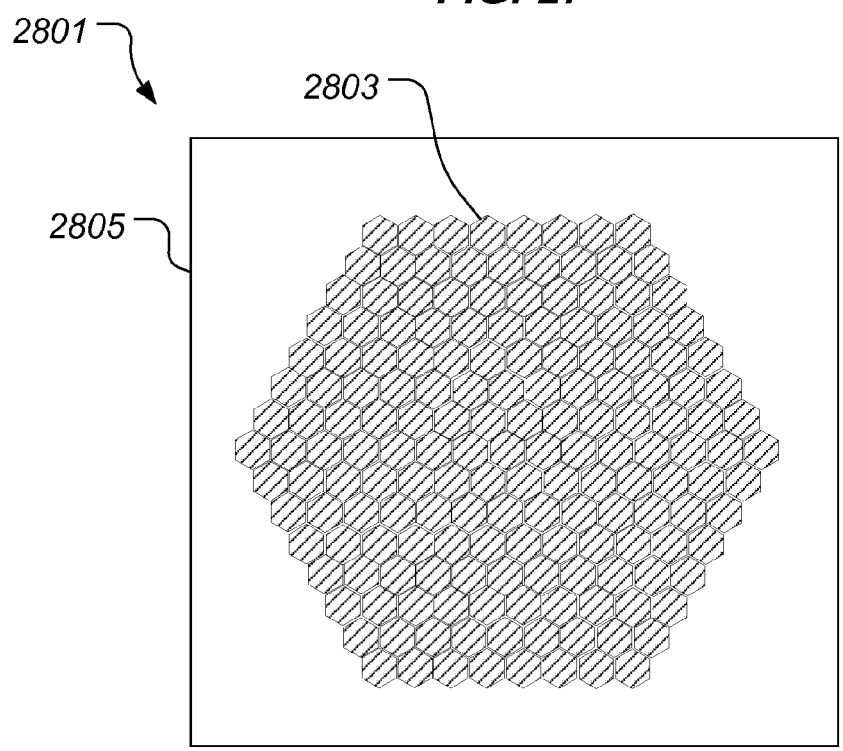
FIG. 28 is a front view of a fixture for supporting a bulk composite core, according to one example embodiment.
Figure 29:
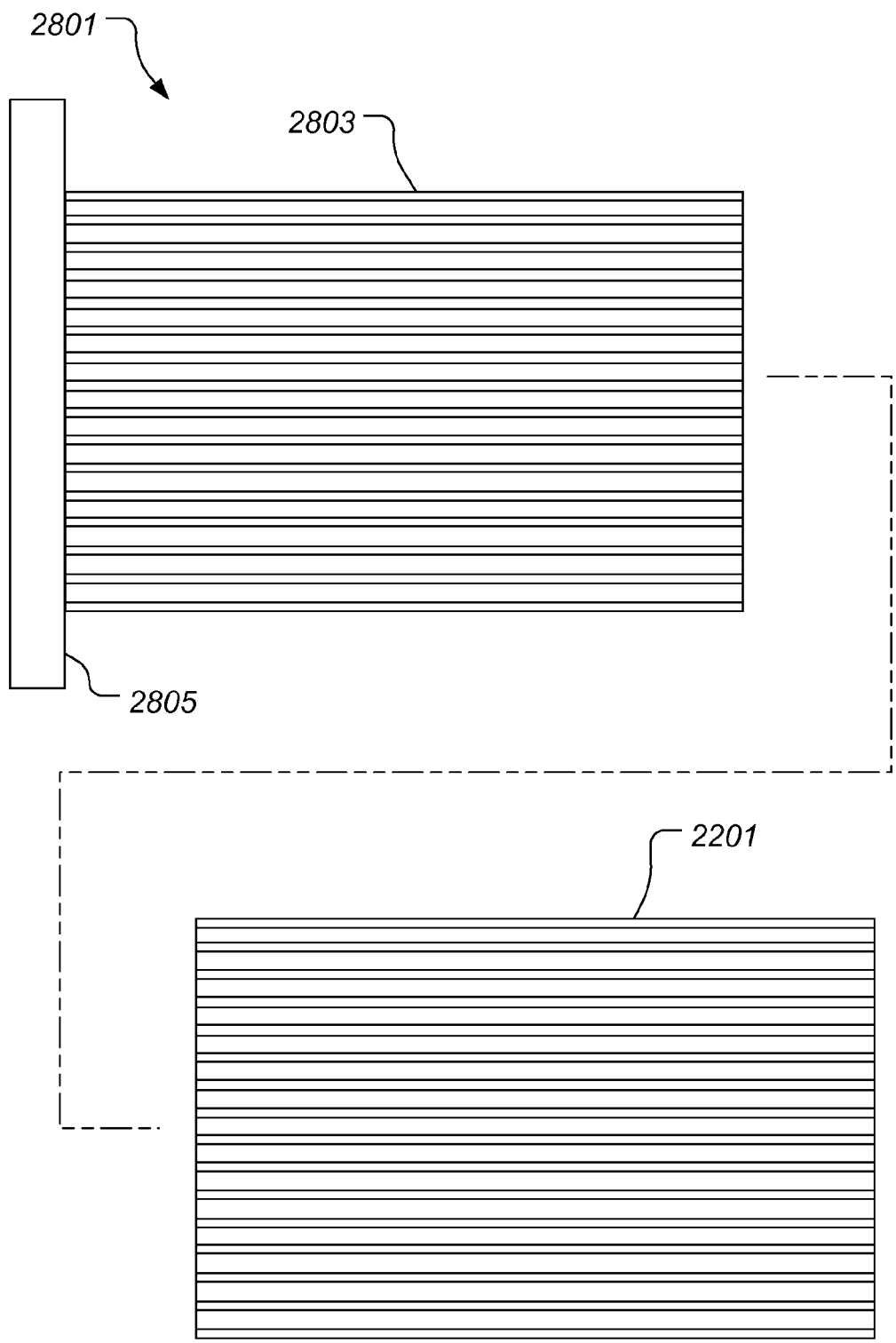
FIG. 29 is a side view of a fixture for supporting a bulk composite core, according to one example embodiment.

Referring now also to FIGS. 28 and 29, a fixture 2801 for supporting a bulk composite core 2201 for the cutting of wafers 2401 therefrom is illustrated. In the illustrated embodiment, fixture 2801 includes a plurality of mandrels 2803 that can be affixed to a support 2805. Mandrels 2803 are arranged in a geometry pattern so as to align with the center of tubes 2203. Further, each mandrel 2803 has a geometry that corresponds with the geometry of each tube 2203 in the bulk composite core 2201. The mandrels 2803 are spaced to allow for the bulk composite core 2201 to slide onto the mandrels 2803, which provide support during a cutting operation, as depicted in FIG. 29.

In one embodiment, mandrels 2803 are solid rigid mandrels that are configured to support a main body portion of bulk composite core 2201 while a wafer 2401 is cut near an end portion of bulk composite core 2201 that does not have mandrels 2803 extending therethrough. In another embodiment, mandrels 2803 are sacrificial such that the mandrel material is a material that can be easily cut through, such as a foam, so that the cutter cuts not only through the bulk composite core 2201 but also the mandrels 2803. Such a configuration not only prevents the bulk composite core 2201 from distorting during the cutting process, but also can reduce localized vibration due to cutting. Furthermore, the sacrificial mandrel embodiment of fixture 2801 may not include support 2805.

Figure 30:
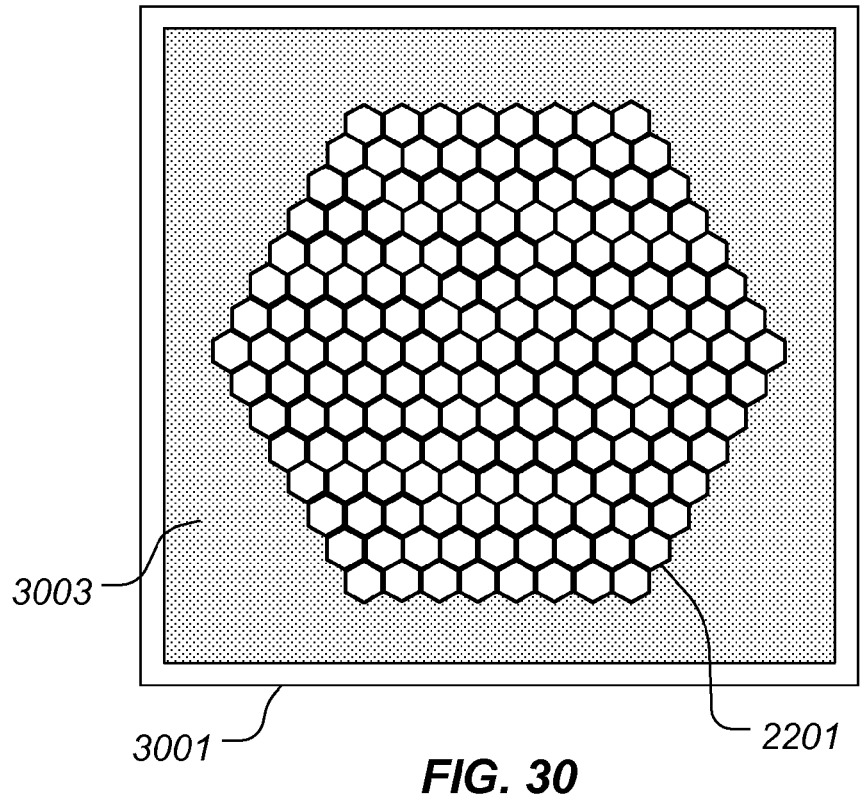
FIG. 30 is a top view of a support system for supporting a bulk composite core, according to one example embodiment.

Referring now also to FIG. 30, another embodiment of a system configured to support a bulk composite core 2201 while a wafer 2401 is cut therefrom is illustrated. In the illustrated embodiment, bulk composite core 2201 is placed in a container 3001 and then surrounded by a compound 3003 that can bond to the outer surface of bulk composite core 2201 and solidify, such as a potting compound or expanding foam, to name a few examples. Bulk composite core 2201 with compound 3003 bonded thereto can be removed from container 3001 so that one or more wafers 2401 can be cut therefrom, as further described herein. Compound 3003, in a cured state, provides rigid support to bulk composite core 2201 during a wafer cutting process. In one embodiment, the compound 3003 can be removed from the exterior surfaces of the wafer 2401 during a cleaning operation. In another embodiment, the outer cells are machined away from the internal portion of wafer 2401 such that any composite core material contaminated with compound 3003 is removed.

Figure 31:
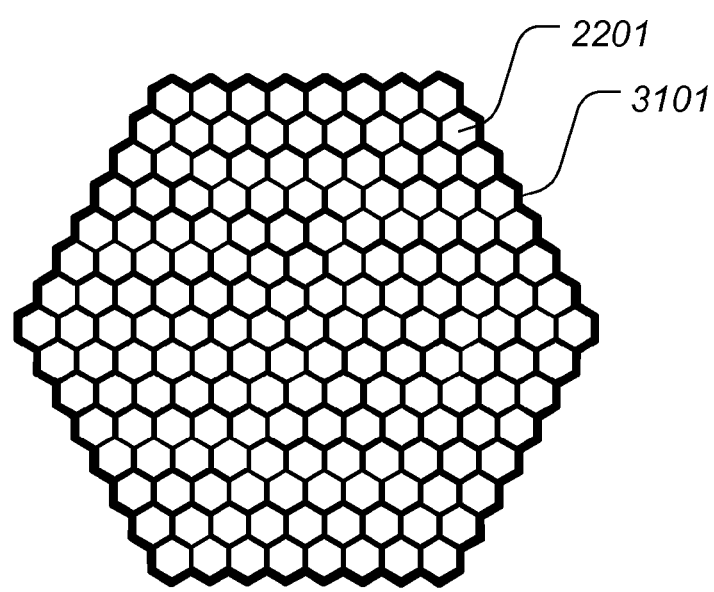
FIG. 31 is an end view of a support system for supporting a bulk composite core, according to one example embodiment.

Referring now also to FIG. 31, another embodiment of a system configured to support a bulk composite core 2201 while a wafer 2401 is cut therefrom is illustrated. In the illustrated embodiment, a composite wrap 3101 can include one or more plies of composite material wrapped around a cured bulk composite core 2201. The composite wrap 3101 is cured in accordance with the implementation specific composite system. For example, the composite wrap 3101 can be cured in a room temperature environment or an oven. In an alternative embodiment, composite wrap 3101 is layed up when bulk composite core 2201 is uncured. For example, an uncured composite wrap 3101 can be layed up around an assembly of uncured composite wrapped mandrels, and then co-cured in a tool, such as tool 1201 illustrated in FIG. 19.

Composite wrap 3101 is configured to provides strength and stiffness to bulk composite core 2201 while wafer 2401 is cut therefrom. Further, since deformation due to cutting induced torque occurs from the outside, composite core 2201 is particularly useful for resisting torque deformation. After the wafer 2401 is cut from the bulk composite core 2201, the composite wrap 3101 can be machined away. For example, the outer cells can be machined away from the internal portion of wafer 2401 such that composite wrap 3101 is removed.

Referring again briefly to FIG. 26, the method of cutting wafers 2401 from bulk composite core 2201 can include cutting off a wafer 2401, then repeatedly repositioning the remaining bulk composite core 2201 and cutting additional wafers 2401. However, as the remaining portion of the bulk composite core 2201 becomes shorter, the effectiveness of fixture 2501 can be compromised. For example, fixture 2501 can lose effectiveness when the length L1 of the bulk composite core 2201 is less than 50% of the width W1. By way of example, if the width W1 is 18 inches, then a length L1 of less than 9 inches may be undesirable. Hence, there is a need for a method and system for utilizing and cutting one or more wafers 2401 from relatively short sections of bulk composite core 2201.

Therefore, the present disclosure also includes a system and method for joining a plurality of bulk composite cores 2201 end to end. The joining of multiple bulk composite cores 2201 prevents the waste of material that couldn't otherwise be accurately supported by a support tool, such as fixture 2501 for example. Further, joining multiple bulk composite cores 2201 can result in a more efficient wafer cutting operation. For example, a long assembly of bulk composite cores 2201 can be fed through fixture 2501 as cutter 2601 can continuously operate. After a wafer 2401 is cut, cutter 2601 can reposition while the remaining bulk composite core 2201 translates relative to fixture 2501 to expose a desired portion of bulk composite core 2201 for wafer cutting. The cutter 2601 can then make another cut to produce another wafer 2401 at a desired length L2. In one embodiment, once a bulk composite core 2201 is cut down such that the remaining uncut portion is too short to be properly supported by the fixture, the remaining uncut portion can be removed and joined with another bulk composite core 2201.

Figure 32:
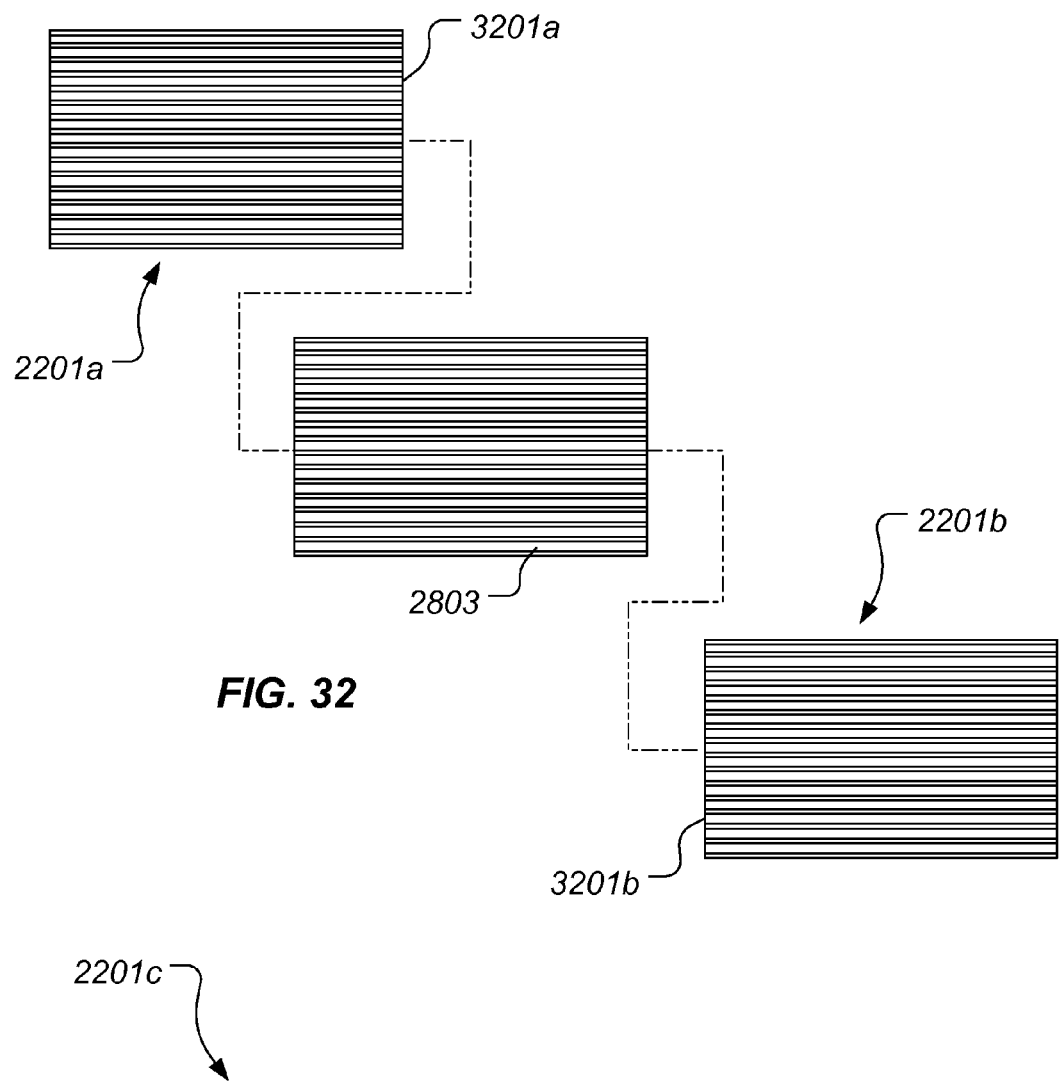
FIG. 32 is a stylized exploded view of method for joining bulk composite cores, according to one example embodiment.

Referring now also to FIG. 32, the joining of multiple bulk composite cores is schematically illustrated. A first bulk composite core 2201a has a first bonding surface 3201a and a second bulk composite core 2201b has a second bonding surface 3201b. An adhesive can be applied to the first bonding surface 3201a and/or the second bonding surface 3201b in any appropriate process. For example, if the bond qualities of a film adhesive are desired, then the film adhesive can be reticulated on the surface network of at least one of the first bonding surface 3201a or the second bonding surface 3201b. In another embodiment, a paste adhesive can be applied on the surface network of at least one of the first bonding surface 3201a or the second bonding surface 3201b. A plurality of mandrels 2803 that each have a geometry similar to the interior of each cell can be used to assure that the cells of first bulk composite core 2201a align with the cells of second bulk composite core 2201b. The mandrels 2803 extend into corresponding cells of the first bulk composite core 2201a and of second bulk composite core 2201b for alignment thereof. A release agent can be used to prevent the adhesive from bonding to the mandrels 2803. The first bonding surface 3201a of the first bulk composite core 2201a is butted up against the second bonding surface 3201b of the second bulk composite core 2201b and bonded together with the adhesive. During the adhesive curing process, heat may be applied, depending upon the cure requirements of the particular adhesive being used. Further, pressure can be generated at the bondline by pressing first bulk composite core 2201a and second bulk composite core 2201b together. After the adhesive is cured, the mandrels 2803 may be removed. In another embodiment, the mandrels 2803 are moved to toward an exposed end of the core to be used in another joining process.

Figure 33:
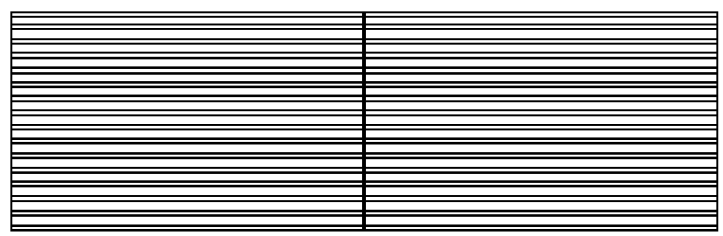
FIG. 33 is a side view of a bonded assembly of multiple bulk composite cores, according to one example embodiment.

Referring now also to FIG. 33, a bulk composite core assembly 2201c is illustrated. Bulk composite core assembly 2201c is the result of first bulk composite core 2201a adhesively joined with second bulk composite core 2201b.

Figure 34:
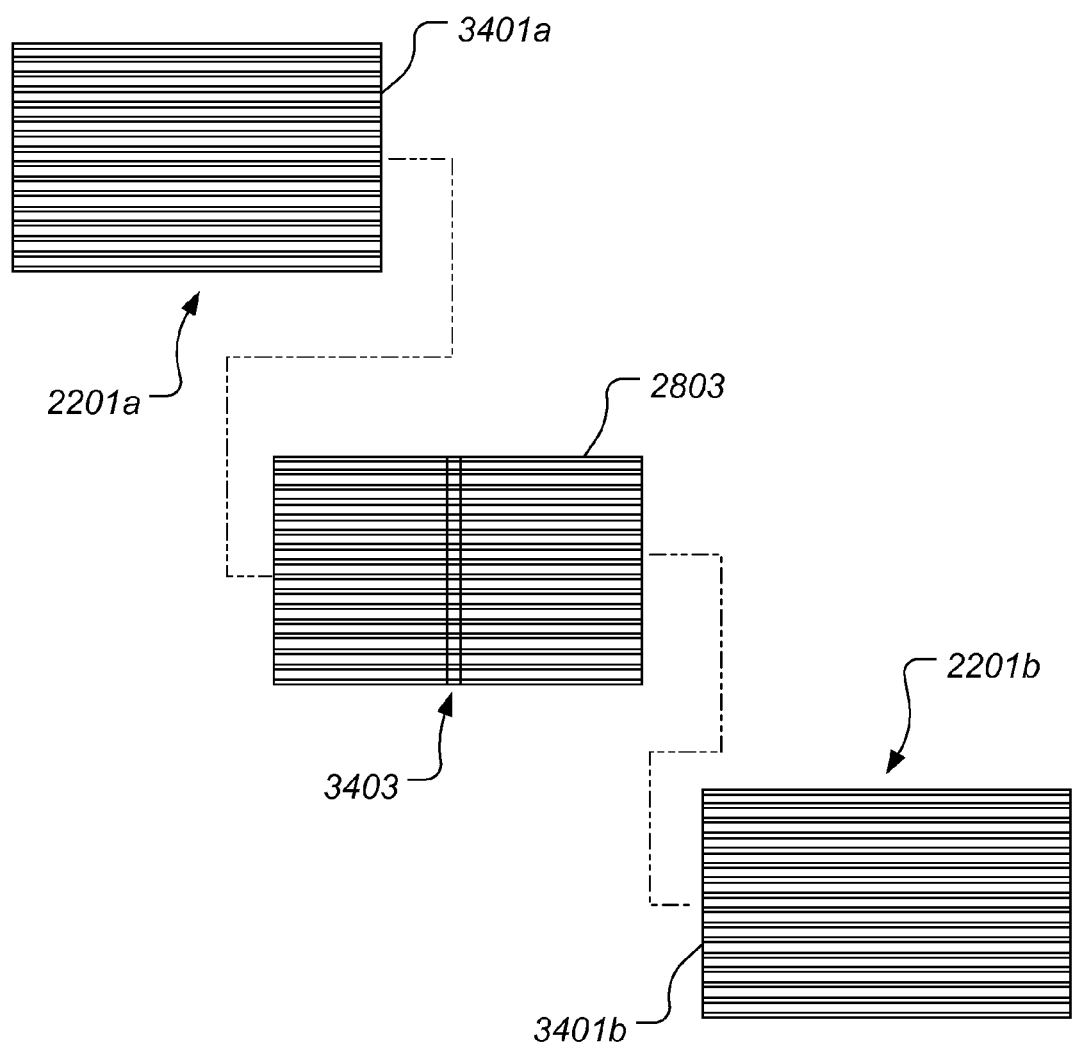
FIG. 34 is a stylized exploded view of method for joining bulk composite cores, according to one example embodiment.

Referring now also to FIG. 34, another embodiment of joining multiple bulk composite cores is schematically illustrated. In the illustrated embodiment, an adhesive is applied around the circumference of each mandrel 2803 at a midsection portion 3403. In one embodiment, an adhesive film is wrapped around the midsection portion 3403 of each mandrel 2803. The first bulk composite core 2201a and the second bulk composite core 2201b are assembled with the mandrels 2803 such that that first surface 3401a of the first bulk composite core 2201a is butted up against the second surface 3401b of the second bulk composite core 2201b, thereby causing a portion of first bulk composite core 2201a and second bulk composite core 2201b to overlap a portion of the adhesive around each mandrel 2803. During an adhesive curing process, heat may be applied, depending upon the cure requirements of the particular adhesive being used. The mandrels can thermal expand during the curing process, thereby forcing the adhesive to the cell walls of the first bulk composite core 2201a and second bulk composite core 2201b. Each mandrel 2803 can have an exterior surface that resists bonding from the adhesive, so that the mandrels 2803 can be removed after the adhesive is cured. For example, a release agent can be applied to the mandrels 2803. In another embodiment, the mandrels 2803 remain with the bulk composite core assembly 2201c. In such an embodiment, mandrels 2803 can be bonded together with the first bulk composite core 2201a and second bulk composite core 2201b. Furthermore, the mandrels 2803 may have a length similar to the adhesive width.

Figure 35:
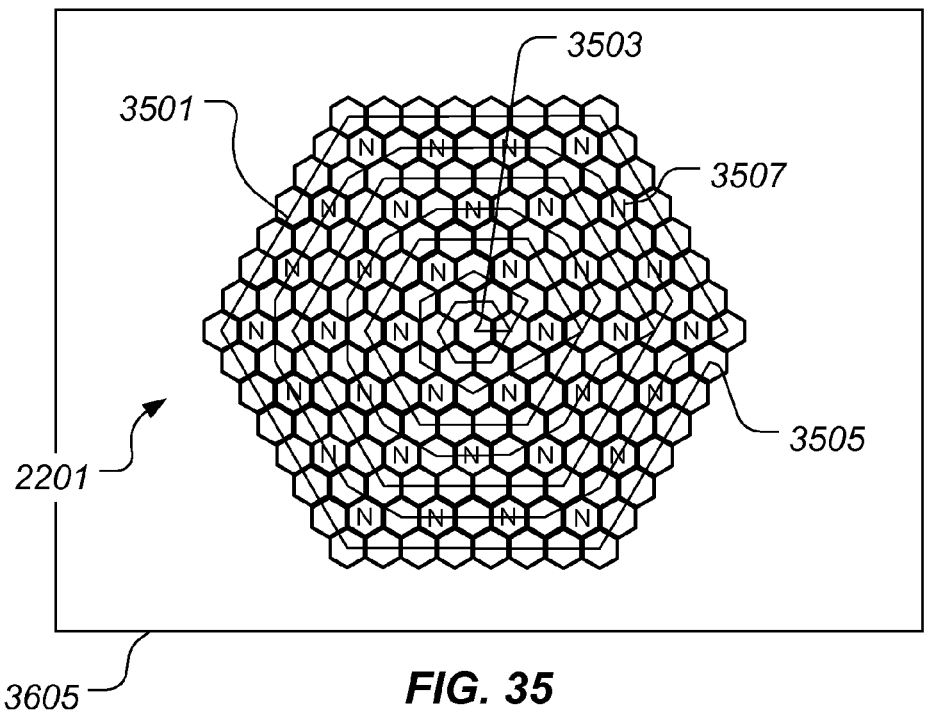
FIG. 35 a stylized top view of a cutting path for cutting a wafer from a bulk composite core, according to one example embodiment.
Figure 36:
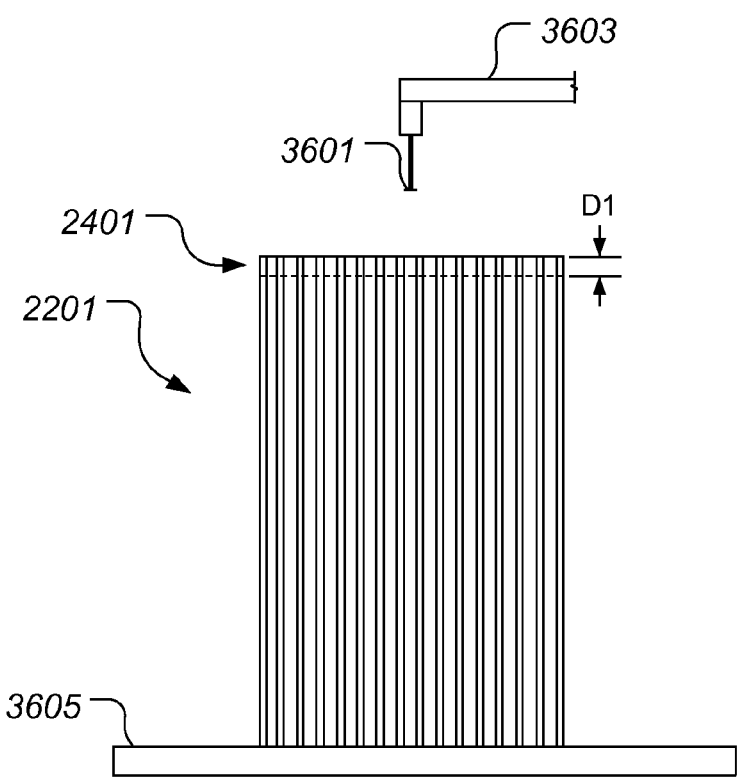
FIG. 36 is a side view of a cutting system for cutting a wafer from a bulk composite core, according to one example embodiment.

Referring now to FIGS. 35 and 36, another embodiment of a method and system for cutting a wafer 2401 from bulk composite core 2201 is schematically illustrated. In the illustrated embodiment, a circular cutting saw 3601 having a diameter smaller than the width of the cell wall width (from flat to flat) is utilized to progressively cut certain cells from the inside out to produce a wafer 2401. For example, a computer numerical control (CNC) machine 3603, or the like, can be programmed with a cutting path 3501. In the illustrated embodiment, cutting path 3501 has a first point 3503 at the center of the bulk composite core 2201. The circular cutter moves to the center of starting point 3503, then moves into the bulk composite core 2201 to a depth D1 which corresponds with the desired length L1 of wafer 2401. The circular cutter then moves toward a cell wall, thereby cutting into the cell wall, then moves around until all of the cell walls of the cell at starting point 3503 have been cut. Next, the circular cutter lifts out of the cell, and then proceeds to the next cell along the cutting path 3501 until the wafer 2401 is completely cut with the cutting of the last cell at last point 3505. In the illustrated embodiment, the cells marked with "N" 3507 are not cut by the circular cutter, rather cells marked with "N" 3507 do not require cutting because the cell walls of surrounding cells are cut therethrough. As such, the cutting path 3501 is an efficient path for cutting a wafer 2401 out of bulk composite core 2201. Further, by cutting the cells walls individually from the inside, distortion from cutting loads are minimized, thus reducing or eliminating the need for a fixture. Bulk composite core 2201 can be temporarily fixed, by taping or the like, to a tool 3605 for support thereof.

In one embodiment, the wafer 2401 is cut from bulk composite core 2201 at a constant depth D1; however, in another embodiment, the CNC machine can be programmed such that the circular cutter creates a wafer 2401 at a profiled depth D1 having any variety of implementation specific contours.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of joining a first bulk composite core and a second bulk composite core, the method comprising the steps of:
   applying an adhesive to a first surface network of the first bulk composite core, the first surface network being an exposed surface at a first termination end of a plurality of cell members of the first bulk composite core;
   inserting a plurality of mandrels into the plurality of cell members of the first bulk composite core and a plurality of cell members of the second composite core, thereby aligning the cell members of the first bulk composite core to the cell members of the second bulk composite core, the second bulk composite core having a second surface network that is an exposed surface at a first termination end of a plurality of cell members of the second bulk composite core;
   pressing together the first surface network of the first bulk composite core and the second surface network the second bulk composite core with the adhesive located therebetween; and
   curing the adhesive.

2. The method according to claim 1, the step of applying the adhesive to the first surface network of the first bulk composite core comprising reticulating a film adhesive onto the first surface network of the first bulk composite core.

3. The method according to claim 1, the step of applying the adhesive to the first surface network of the first bulk composite core comprising pasting a paste adhesive onto the first surface network of the first bulk composite core.

4. The method according to claim 1, wherein the first bulk composite member and second bulk composite member each have a substantially hexagonal outer geometry.

5. The method according to claim 1, wherein each cell member has a hexagonal shaped geometry.

6. The method according to claim 1, wherein each mandrel has a hexagonal shaped geometry.

7. The method according to claim 1, further comprising the step of:
   removing the plurality of mandrels.

8. A method of joining a first bulk composite core and a second bulk composite core, the method comprising the steps of:
   applying an adhesive at a midportion of each of a plurality of mandrels, the midportion being between a first end and a second end of each mandrel;
   inserting the plurality of mandrels into a plurality of cell members of the first bulk composite core and a plurality of cell members of the second composite core, thereby aligning the cell members of the first bulk composite core to the cell members of the second bulk composite core;
   pressing the respective surface networks of the first bulk composite core and the second bulk composite core together; and
   curing the adhesive.

9. The method according to claim 8, wherein the step of curing the adhesive includes thermally expanding the plurality of mandrels.

10. The method according to claim 9, wherein thermally expanding the plurality of mandrels applies pressure to the adhesive at an interior surface of the plurality of cell members of the first bulk composite core and an interior surface of the plurality of cell members of the second bulk composite core.

11. The method according to claim 8, further comprising the step of:
    removing the plurality of mandrels.

12. The method according to claim 8, wherein the step of applying an adhesive to a midportion of each of a plurality of mandrels includes wrapping a film adhesive around an outer surface of each mandrel.

13. The method according to claim 8, wherein the step of applying an adhesive to a midportion of each of a plurality of mandrels includes applying a paste adhesive around an outer surface of each mandrel.

14. A method processing a first bulk composite core and a second bulk composite core, the method comprising the steps of:
    applying an adhesive to a first surface network of the first bulk composite core, the first surface network being an exposed surface at a first termination end of a plurality of cell members of the first bulk composite core;
    inserting a plurality of mandrels into the plurality of cell members of the first bulk composite core and a plurality of cell members of the second bulk composite core, thereby aligning the cell members of the first bulk composite core to the cell members of the second bulk composite core, the second bulk composite core having a second surface network that is an exposed surface at a first termination end of a plurality of cell members of the second bulk composite core;
    pressing together the first surface network of the first bulk composite core and the second surface network of the second bulk composite core together with the adhesive located therebetween;
    curing the adhesive;
    removing the plurality of mandrels; and
    cutting through at least one of the first bulk composite core and the second bulk composite core so as to create a wafer therefrom.

15. The method according to claim 14, further comprising:
    stabilizing at least one of the first bulk composite core and the second bulk composite core with a fixture.

16. The method according to claim 15, the step of stabilizing at least one of the first bulk composite core and the second bulk composite core with a fixture comprises:

supporting at least one of the first bulk composite core and the second bulk composite core with an outer fixture having an inner surface that lies adjacent to outwardly exposed cell walls of outwardly located tube members of at least one of the first bulk composite core and the second bulk composite core.

17. The method according to claim 14, wherein the step of cutting through each of the tube members at least one of the first bulk composite core and the second bulk composite core so as to create a wafer therefrom includes cutting along a plane that is parallel to an exposed surface network of the either the first bulk composite core or the second bulk composite core.

\* \* \* \* \*